United States Patent
Ihara et al.

(10) Patent No.: US 10,222,761 B2
(45) Date of Patent: Mar. 5, 2019

(54) ELECTRONIC TIMEPIECE WITH ELECTROSTATIC INDUCTION GENERATOR

(71) Applicant: CITIZEN WATCH CO., LTD., Tokyo (JP)

(72) Inventors: Takashi Ihara, Tokyo (JP); Akira Izumi, Tokyo (JP); Makoto Watanabe, Saitama (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 15/505,354

(22) PCT Filed: Aug. 13, 2015

(86) PCT No.: PCT/JP2015/072923
§ 371 (c)(1),
(2) Date: Feb. 21, 2017

(87) PCT Pub. No.: WO2016/027748
PCT Pub. Date: Feb. 25, 2016

(65) Prior Publication Data
US 2017/0269557 A1  Sep. 21, 2017

(30) Foreign Application Priority Data
Aug. 22, 2014 (JP) .................. 2014-169370

(51) Int. Cl.
*G04C 10/00* (2006.01)
*G04G 19/00* (2006.01)
(Continued)

(52) U.S. Cl.
CPC ............. *G04G 19/00* (2013.01); *G04C 10/00* (2013.01); *G04C 10/02* (2013.01); *H02N 1/08* (2013.01)

(58) Field of Classification Search
CPC ........ G04G 19/00; G04C 10/00; G04C 10/02; G04B 5/00; G04B 5/02; G04B 5/04; H02N 1/08
See application file for complete search history.

(56) References Cited

U.S. PATENT DOCUMENTS 6,275,450 B1 * 8/2001 Makiba .................. G04B 19/06
368/223
9,484,842 B2 * 11/2016 Wang ........................ H02N 1/04
(Continued)

FOREIGN PATENT DOCUMENTS

EP 1672441 A1 6/2006
JP S52-008868 A 1/1977
(Continued)

OTHER PUBLICATIONS

International Search Report for PCT/JP2015/072923, dated Nov. 17, 2015.
(Continued)

*Primary Examiner* — Sean P Kayes

(57) ABSTRACT

An electronic watch or clock with an electrostatic induction generator, wherein the electrostatic induction generator has a rotary weight able to rotate with respect to a housing, a rotary member able to rotate with respect to the housing, a counter substrate fastened to the housing, a charging film arranged at one of the rotary member and counter substrate, and a counter electrode arranged facing the charging film at the other, outputs electric power generated between the charging film and the counter electrode to a quartz movement, and provides a window part at one or more locations among the dial plate, housing, or outside casing to enable rotation of the rotary member or transmission of rotation to be visually confirmed.

16 Claims, 23 Drawing Sheets

(51) Int. Cl.
  *H02N 1/08*   (2006.01)
  *G04C 10/02*  (2006.01)

(56) References Cited

U.S. PATENT DOCUMENTS

| | | | | |
|---|---|---|---|---|
| 9,665,069 | B2* | 5/2017 | Hamatani | G04C 10/00 |
| 9,836,027 | B2* | 12/2017 | Willemin | G04D 7/009 |
| 2007/0223318 | A1 | 9/2007 | Nobs | |
| 2014/0104991 | A1* | 4/2014 | Rochat | G04F 7/0866 |
| | | | | 368/11 |
| 2015/0362892 | A1* | 12/2015 | Zaugg | G04C 3/064 |
| | | | | 368/168 |
| 2016/0170377 | A1 | 6/2016 | Hamatani et al. | |
| 2017/0019035 | A1 | 1/2017 | Matsumoto et al. | |

FOREIGN PATENT DOCUMENTS

| | | |
|---|---|---|
| JP | 3484704 B | 1/2004 |
| JP | 2010-279192 A | 12/2010 |
| JP | 2010-279201 A | 12/2010 |
| JP | 2011-101499 A | 5/2011 |
| JP | 2013-059149 A | 3/2013 |
| JP | 2013-135544 A | 7/2013 |
| JP | 2013-219897 A | 10/2013 |
| WO | 2015/029697 A1 | 3/2015 |
| WO | 2015/151996 A1 | 10/2015 |

OTHER PUBLICATIONS

International Preliminary Report on Patentability for PCT/JP2015/072923, dated Nov. 17, 2015.
EPO, Extended European Search Report, dated Mar. 12, 2018.

* cited by examiner (e)

(f)

(g)

(a)

(b)

ELECTRONIC TIMEPIECE WITH ELECTROSTATIC INDUCTION GENERATOR

TECHNICAL FIELD

The present invention relates to an electronic watch, clock or timepiece with an electrostatic induction generator designed to enable a user to check the state of power generation.

BACKGROUND ART

A wristwatch or other portable electronic clock containing a solar cell module or other power generation device and operating without having to replace batteries has been realized. A power generation device such as a solar cell module has the problem that the density of useable energy inside a room is low except when under direct sunlight and further that continuous energy cannot be obtained. For this reason, a watch has a power save function whereby it automatically enters a power conserving state when detecting that light is not striking the solar cell module and power has not been generated for a certain time. Further, as shown in PLT 1, even an electronic watch with an electromagnetic induction generator which captures movement of a user's arm etc. to convert kinetic energy to electrical energy has a power save function where a power conserving mode is entered automatically so as to reduce the power consumption of a storage battery (secondary cell) when not carried.

An electronic watch entering such a power save mode ends up with the liquid crystal display extinguished and the hands stopped, so the user often mistakenly believes it has broken down. For this reason, users often ask "My watch has stopped. What should I do?" Manufacturers have prepared answers to this as a typical frequently asked question (FAQ). To prevent such misunderstandings, the method is known of making a power saving mark flash or using other display means to inform the user of the situation. However, not only does the cost increase by the amount of provision of the display means, but also it becomes necessary to secure space for the display of the display means. There was the problem that the size of the watch ended up becoming larger by that amount. Further, when the level of charge of the secondary battery became lower and became the power becomes insufficient, it became necessary to place the solar cell module in direct sunlight to charge it and confirm operation. This often led to failure to immediately judge breakdown. It became necessary to deal with such doubts on the part of the consumers as well.

On the other hand, in recent years, practical power generating devices utilizing electrostatic induction by electret materials have been developed as disclosed in PLTs 2 to 5. "Electrostatic induction" is the phenomenon of a charge of an opposite polarity from a charged object being induced by the charged object being brought into proximity with a conductor. A power generation device utilizing the phenomenon of electrostatic induction generates power by utilizing this phenomenon to take out a charge induced by relatively movement of two members in a structure comprised of a "film holding a charge" (below, referred to as a "charging film") and a "counter electrode".

FIG. 1 is an explanatory view for explaining the principle of power generation utilizing the phenomenon of electrostatic induction.

If taking as an example the case of using an electret material, an electret is a dielectric material given an electric charge and generates an electrostatic field semipermanently. In power generation by this electret, as seen in FIG. 1, the electret 3 and the counter electrode 2 are brought into proximity. The electrostatic field formed by the electret causes formation of an induced charge at the counter electrode. If changing the overlapping area of the electret and counter electrode (by vibration etc.), it is possible to take out alternating current at the outside electrical circuit 300. Power generation by an electret is relatively simple in terms of structure and utilizes electromagnetic induction, so gives a high output in the low frequency region and is therefore advantageous. In recent years, it has been focused on for so-called "energy harvesting".

PLT 2 discloses a power generating device providing a radially cut electrode and electret film at a rotating plate rotating with respect to a main plate provided at the watch module, providing a radially cut electrode on the main plate, making the rotating plate rotate with respect to the main plate, and converting the energy of rotary motion to electrical energy. PLT 3 also discloses a power generating device similar to the power generating device of PLT 2 provided with an electrode or electret film at a side surface of a rotary member and a surface facing the same. Furthermore, PLTs 4 and 5 disclose electrostatic induction type power generating devices using hairsprings (one type of spiral spring, watchmaker's term) to make the electret film and electrode move back and forth and periodically rotate. When applying these power generating devices to portable electronic watches, in the same way as the solar cell modules and other electronic watches or clocks explained above, the above problem arises that the user will frequently end up misconstruing the power save mode as a breakdown.

The prior arts of PLTs 2 to 5 all disclose a rotating disk provided with an electret film or electrode in a case or deep beyond a main plate. Rotational operation of the electret cannot be visually confirmed from the outside. For this reason, in the power save mode or when the charge of the secondary battery becomes low and therefore power becomes insufficient, the user could not immediately confirm the state of power generation.

CITATION LIST

Patent Literature

PLT 1: Japanese Patent No. 3484704B2
PLT 2: Japanese Unexamined Patent Publication No. 2010-279192A
PLT 3: Japanese Unexamined Patent Publication No. 2013-219897A
PLT 4: Japanese Unexamined Patent Publication No. 2013-059149A
PLT 5: Japanese Unexamined Patent Publication No. 2013-135544A

SUMMARY OF INVENTION

An object of present invention is to enable operation of a rotary member (electret) of an electrostatic induction generator to be visually confirmed from the outside to counter misunderstandings of the user etc. and to enable a user to easily recognize the state of power generation.

The electronic watch with an electrostatic induction generator includes an outside casing including protective glass, a dial plate, a housing, a quartz movement arranged inside the housing, an electrostatic induction generator arranged inside the housing, wherein electrostatic induction generator includes a rotary weight able to rotate with respect to the housing, a rotary member able to rotate with respect to the housing, a counter substrate fixed to the housing, a charging film set at one of the rotary member and the counter substrate, and a counter electrode set facing the charging film at the other of the rotary member and the counter substrate, a window part provided at one or more locations of the dial plate, the housing, and the outside casing for visual confirmation of rotation of the rotary member or transmission of rotation, and an output part outputting the power generated between the charging film and the counter electrode to the quartz movement.

FIG. 2 is a view visually showing an outline of the present invention.

As shown in FIG. 2, it is possible to visually confirm rotational of the rotary member 4 from the outside, so a user can easily recognize the state of power generation. Further, the rotary member 4 is formed with radially cut parts etc. and is interesting visually. Rotation, as shown in FIG. 2, creates interest in the user over the state of power generation thanks to the design, so the user can be prompted to continually generate power. Further, the user can visually confirm rotational of the rotary member 4 from the outside while learning what kind of movement enables the rotary member 4 to efficiently rotate when carried. Due to this, the present invention not only makes it possible to visually confirm operation from the outside and therefore reduce instances of the power save mode being mistakenly understood, but also makes it possible to keep a user conscious of the operating state when carried and thereby enables power to be efficiently generated and the chance of insufficient power to be greatly reduced.

BRIEF DESCRIPTION OF DRAWINGS

FIG. 22(a) is a schematic cross-sectional view showing one example of a window part of the present invention while FIG. 22(b) is a plan view showing a main plate in FIG. 22(a).

DESCRIPTION OF EMBODIMENTS

Figure 1:
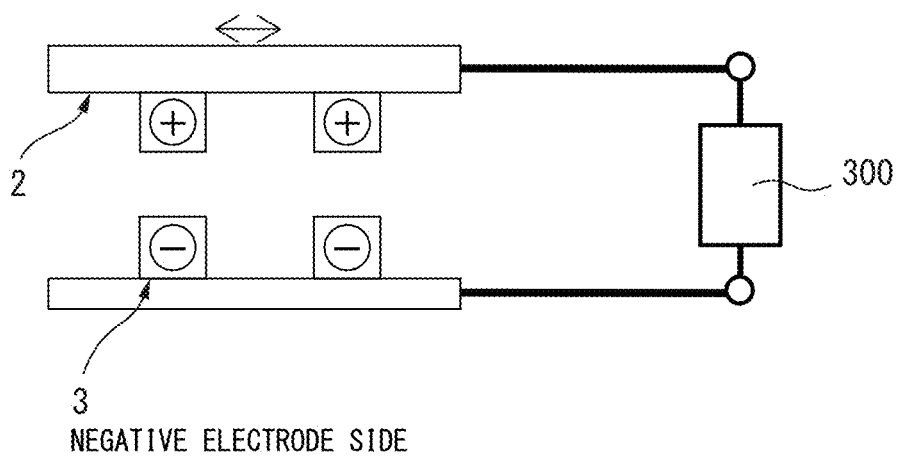
FIG. 1 is an explanatory view for explaining a principle of power generation utilizing the phenomenon of electrostatic induction.

Below, embodiments of the present invention will be explained while referring to the drawings focusing on FIG. 2 as one example showing an outline of the present invention. In the embodiments, parts of the same configuration are assigned the same reference notations and explanations thereof are omitted.

The provision of a window part has an unanticipated reverse effect in an electrostatic induction generator. If outside light directly strikes the charging film, depending on the charging film, sometimes not only is deterioration of the characteristics caused, but also the outside light striking an IC etc. on the circuit board of the quartz movement causes an increase in the consumed current or invites mistaken operation of the IC. This is not preferable from the viewpoints of reduction of the consumed power and prevention of mistaken operation. For this reason, to prevent outside light from directly striking the charging film, various measures are taken in each embodiment. In the following embodiments, a wristwatch was used for explaining the invention, but the invention is not necessarily limited to a wristwatch. In any portable electronic/electrical equipment with an electrostatic induction generator, it is possible to provide a window part to obtain an effect similar to the effect of the present invention and enable application.

First Embodiment

Figure 2:
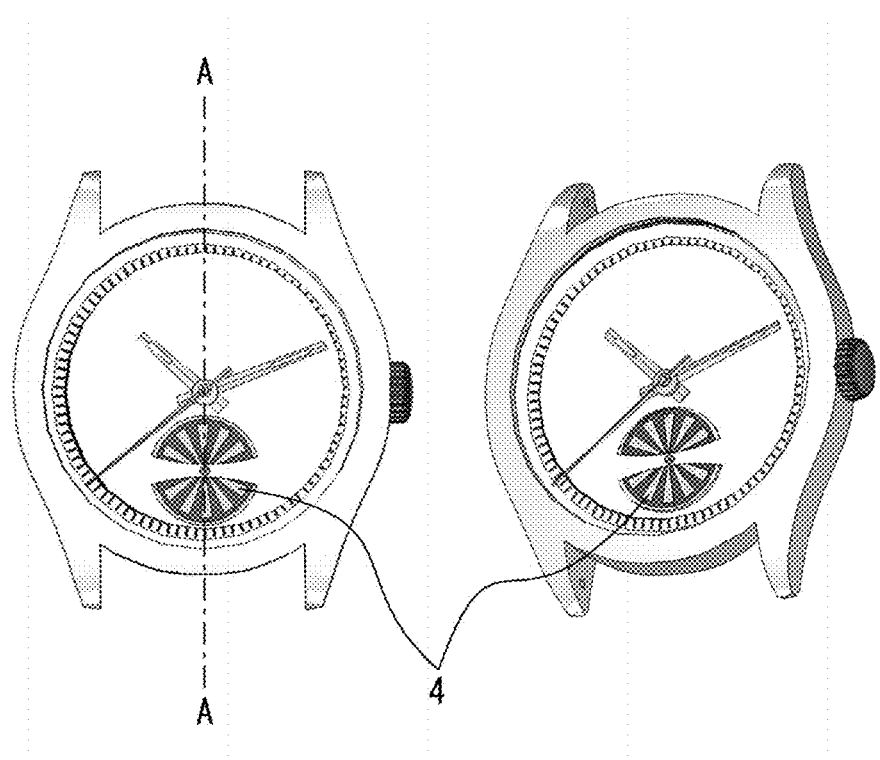
FIG. 2 is a view visually showing an outline of the present invention.
Figure 3:
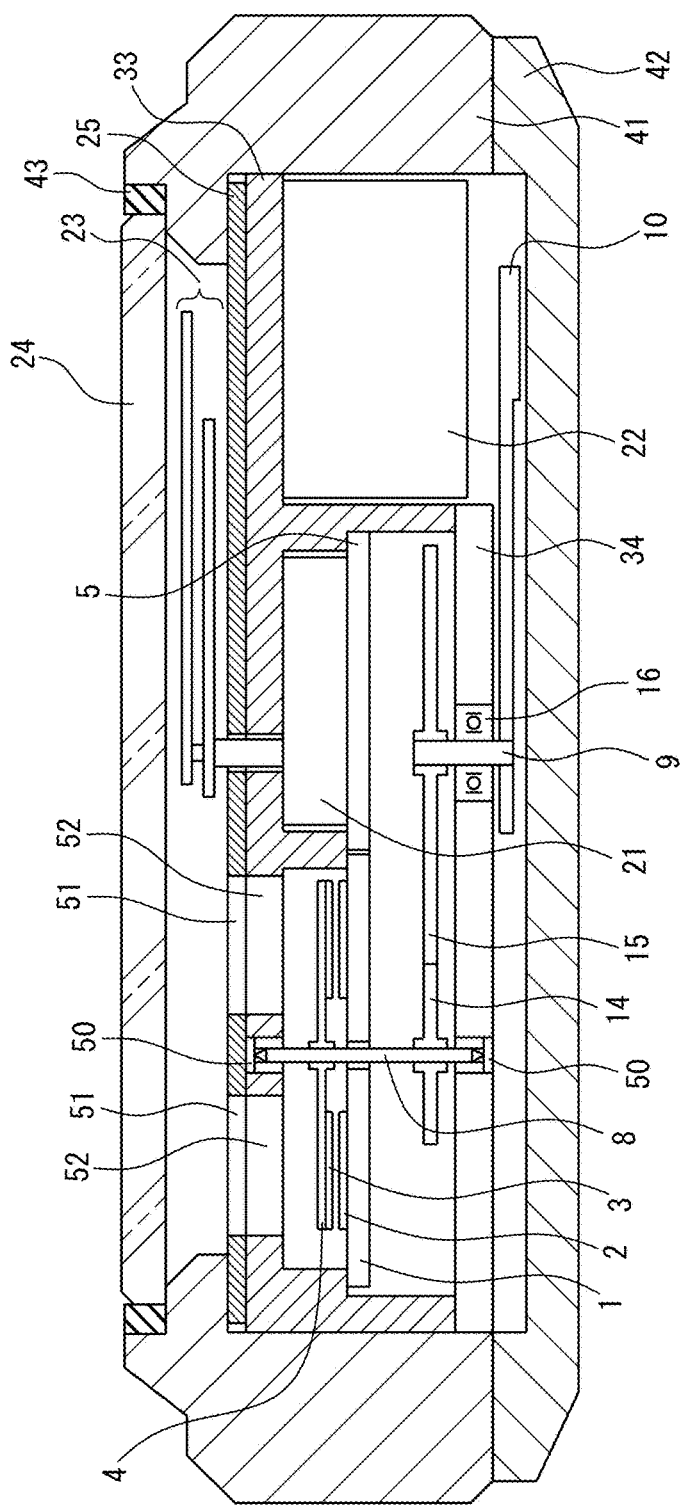
FIG. 3 is a schematic cross-sectional view relating to the line A-A of FIG. 2 showing a first embodiment of the present invention. With the exception of part of the layout, this also shows a second embodiment of the present invention.
Figure 4:
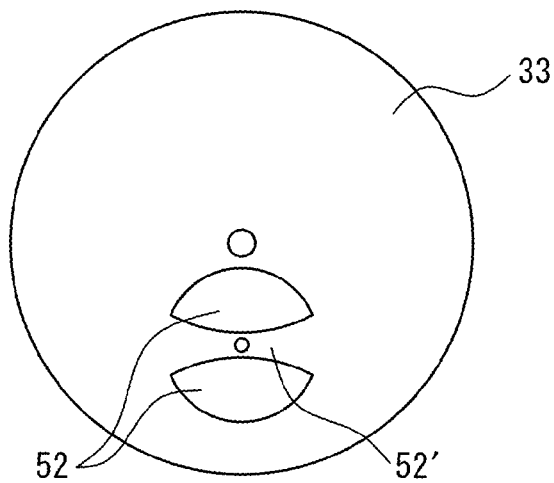
FIG. 4 is a plan view of a main plate of the first embodiment of the present invention.
Figure 5:
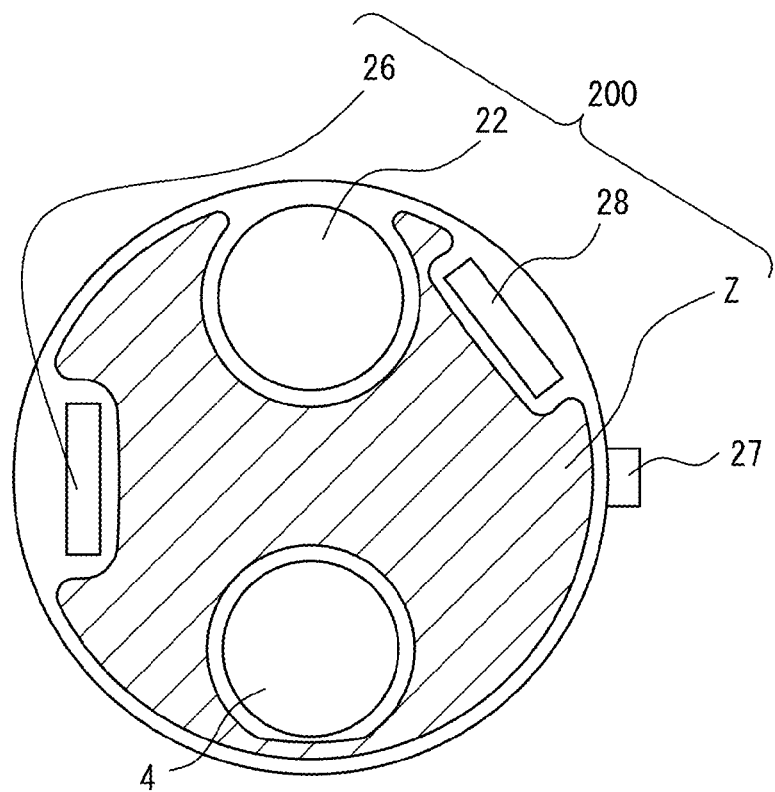
FIG. 5 gives an outline showing an internal structure of the first embodiment of the present invention.
Figure 6:
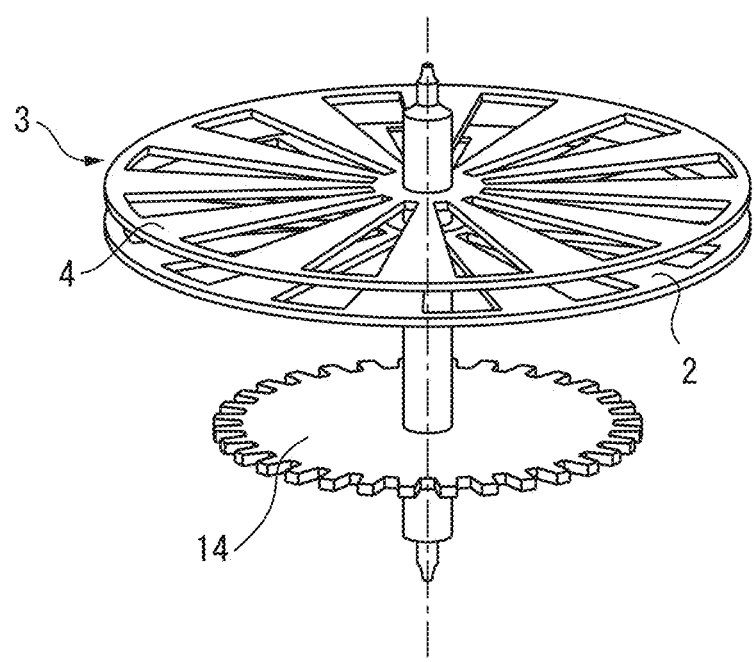
FIG. 6 is a partial perspective view for explaining the first embodiment of the present invention.

FIG. 3 is a schematic cross-sectional view along the line A-A of FIG. 2 showing a first embodiment of the present invention. FIG. 4 is a plan view of a main plate of the first embodiment of the present invention. FIG. 5 gives an outline showing an internal structure of the first embodiment of the present invention. FIG. 6 is a partial perspective view for explaining the first embodiment of the present invention.

Figure 7:
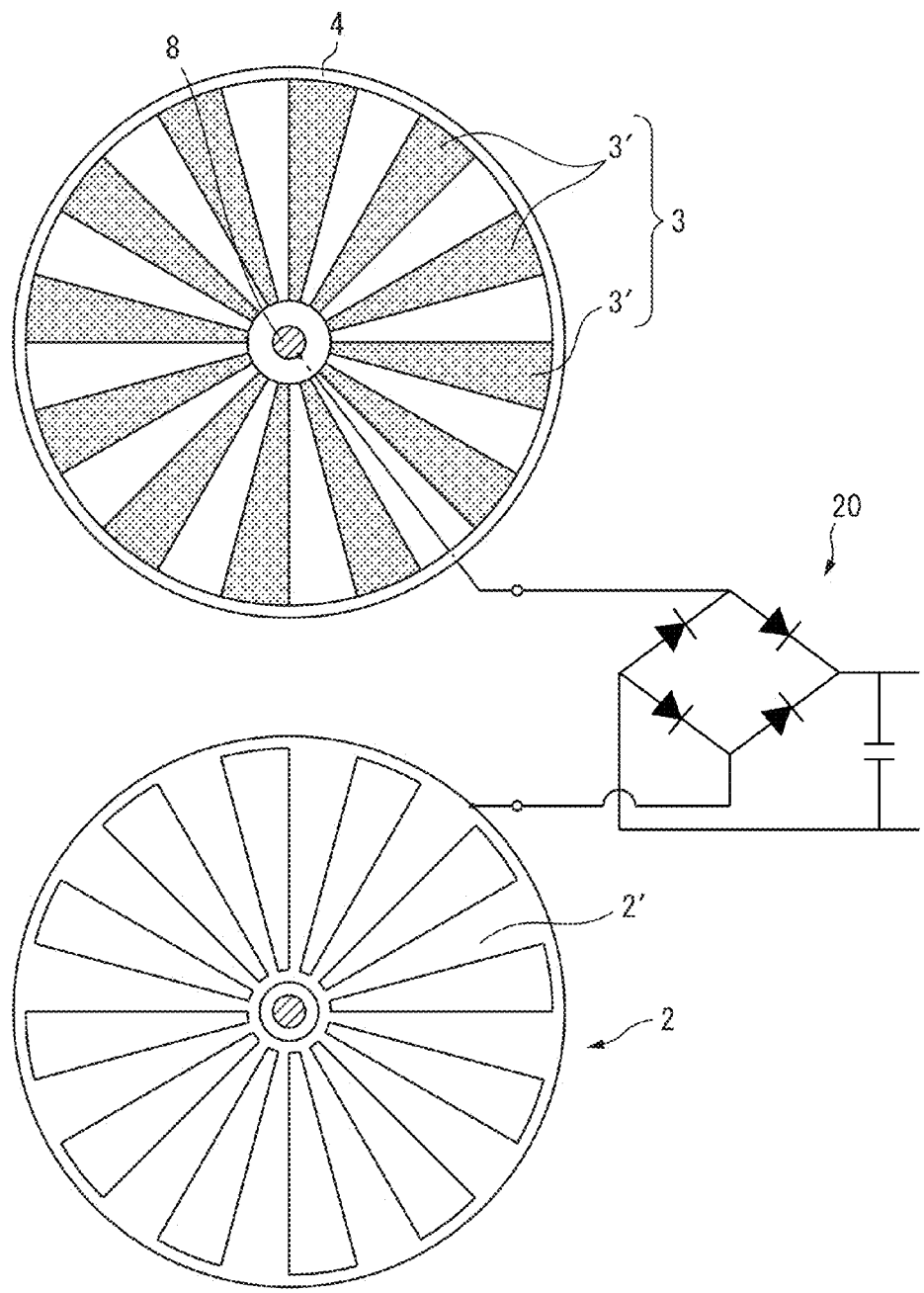
FIG. 7 is a view showing patterns of a counter electrode 2 and charging film 3 of the first embodiment of the present invention.
Figure 8:
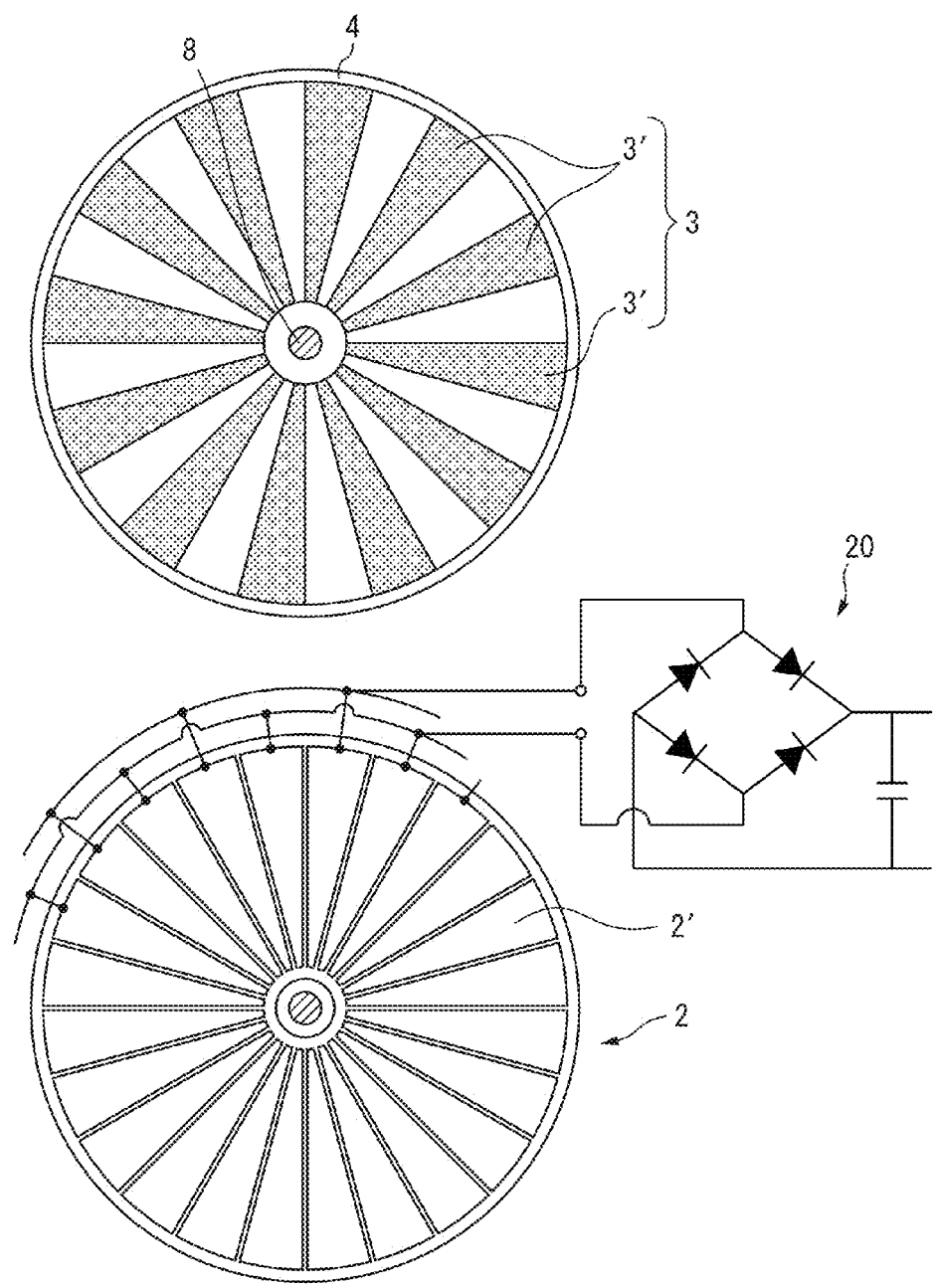
FIG. 8 is a view showing other patterns of a counter electrode 2 and charging film 3 of the first embodiment of the present invention.

FIG. 7 is a view showing patterns of a counter electrode 2 and charging film 3 of the first embodiment of the present invention. FIG. 8 is a view showing other patterns of a counter electrode 2 and charging film 3 of the first embodiment of the present invention. In the cross-sectional view of FIG. 3, the protective glass 24 side is called the "top part", the "top side", and "above", while the case back 42 side is called the "bottom part", "bottom side", and "below".

Below, the first embodiment will be explained with reference to the drawings. The present embodiment is an embodiment in the case of application to a wristwatch or other portable electronic watch. The portable electronic watch has an outside casing 41 and 42 (case back 42) including protective glass 24, a dial plate 25, a housing 33 and 34, a quartz movement 200 provided inside this housing, and an electrostatic induction generator provided inside the housing. The protective glass 24 is fit in the outside casing 41 through a packing 43. The protective glass 24 is not limited to mineral glass and may also be formed by a plastic or other general transparent material.

The housing is explained below by terms frequently used in wristwatches, that is, the main plate 33 and bridge 34. The "main plate 33" means a type of housing such as the base, support plate, inside casing, etc. in which various parts are assembled. Further, the "bridge" is a term often used in the case of a part fulfilling the role of supporting the shaft of the rotary member and fastening and holding the parts. The dial plate 25 and the main plate 33 are respectively provided with window parts enabling the inside to be visually confirmed (window part 51 of dial plate and window part 52 of main plate). In FIG. 2, a window part was provided at the 6:00 position of the dial plate 25, but it may also be provided at the 12:00 or 3:00 or 9:00 or other position. FIG. 4 shows one example of the window part 52 of the main plate. The window part 51 of the dial plate is similarly shaped, but it is not limited to this. The window part 51 of the dial plate and the window part 52 of the main plate may be any shapes so long as shapes enabling the inside (rotary member 4) to be visually confirmed through the two. The window part 51 of the dial plate and the window part 52 of the main plate usually are made holes, but the holes may also have light passing materials fit into them.

The quartz movement 200 here is defined as including a crystal oscillator 28, circuit board 5, coil 26, step motor provided with a rotor stator for motor use, hand-driving gears, secondary battery 22, etc. At the circuit board 5, an oscillation circuit, frequency division circuit, step motor drive circuit, rectification circuit, power circuit, etc. are built in. At the gear drive part 21, parts of the quartz movement such as the coil 26, step motor, hand-driving gears, etc. are included. As seen in FIG. 3, from the gear drive part 21, a hand shaft sticks out above the dial plate 25 and has a hour hand, minute hand, second hand (second hand not shown), and other hands 23 attached to it. FIG. 5 shows an outline of the internal structure of a watch including the quartz movement 200 and electrostatic induction generator. The part Z in FIG. 5 is a general region in which the main plate and parts of the quartz movement 200 are suitably laid out. Reference numeral 27 shows a crown. At the part Z, the gear drive part 21 and the circuit board 5 etc. of the quartz movement are arranged, but the layout may be suitably determined in accordance with the design.

Next, referring to FIG. 3 and FIG. 6, the configuration of an electrostatic induction generator will be explained. A shaft 8 has a rotary member 4 fixed to it. At the bottom surface of the rotary member 4, a charging film 3 is arranged. On the other hand, to face the charging film 3, a counter substrate 1 on the top surface of which a counter electrode 2 is arranged is set and fastened at the main plate 33. The circuit board 5 of the quartz movement 200 like the counter substrate is set and fastened at the main plate 33. Here, to enable precise control of the gap between the counter substrate 1 and the charging film 3, the counter substrate 1 and the circuit board 5 are separately fabricated, but if similar positional precision can be satisfied, the circuit board 5 and the counter substrate 1 can be formed as the same board. When the circuit board 5 and the counter substrate 1 are separate, a connector, conductive springs, connection terminals, etc. are used for electrically connecting them. The same is true in the later explained embodiments.

If the rotary member 4 rotates, power is generated by electrostatic induction. The power generated between the charging film 3 and the counter electrode 2 is output to the quartz movement 200 (circuit board 5). FIG. 6 schematically shows the state of arrangement of the charging film 3 below the rotary member 4 and arrangement of the counter electrode 2 to face the charging film 3 by a perspective view. In the present embodiment, the window part 51 of the dial plate 25, the window part 52 of the main plate 33, rotary member 4, charging film 3, counter electrode 2, counter substrate 1, and bridge 34 are arranged in that order from the top part toward the bottom part.

The rotary member 4 and the charging film 3 at the bottom surface of the same, as shown in FIGS. 6 and 7, are respectively formed into radially cut shapes (circular sector). Between the radially cut parts, blank spaces (through holes, windows) are formed. Here, outside light enters through the window parts 51 and 52, so it is important that the charging film 3 be provided at the bottom surface of the rotary member 4 of the non-light passing material (be shielded from light). The shaft 8 is supported by shock protection systems (as one example, parashocks) and other bearings 50 provided at the main plate 33 and bridge 34. Between the two fan-shaped main plate window parts 52, a bridge 52' (FIG. 4) is formed at the main plate. A bearing 50 is provided there. The direction of the bridge 52 is perpendicular to the line A-A in FIG. 2, but the invention is not limited to this. It may be suitably set to any direction.

The shaft 8 is supported by the bearing 50 of the bridge 52' and passes through the counter substrate 1 to be supported at the bridge 34 by the bearing 50. The rotary weight (rotor) 10 rotates capturing the movement of the arm. At the bottom side of the counter substrate 1 along the shaft 8, a gear 15 fastened to the shaft 9 and a gear 14 fastened to the shaft 8 are provided, as a gear transmission mechanism from the rotary weight 10 fastened to the shaft 9, to the shaft 8. In this case, if the rotation of the rotary weight 10 is accelerated (speeded up) by gears 14, 15 and the shaft 8 is rotated, the charging film (electret film) 3 set at the rotary member can be made to rotate increased in speed with respect to the counter electrode 2 stationary on the main plate. If the speed of the rotary member 4 rises, the amount of power generation can be raised. Note that, the gear transmission mechanism is not limited to two gears. Three or more gears may be combined to form a gear train. Further, a mechanism containing a specialty gear, cam, link, one-way clutch, etc. interposed in the middle is also included in a gear transmission mechanism referred to here. The shaft 9 here is supported at the bridge 34 through a bearing 16. For support of the shaft 9, support at the main plate 33 and bridge 34 is also possible.

As the gear transmission mechanism from the rotary weight 10 fastened to the shaft 9, to the shaft 8, it is possible to use the self-winding rotation drive technology known up to now in mechanical type wristwatches. For example, if converting rotation of the rotary weight 10 fastened to the shaft 9 in both the forward and reverse directions due to movement of the arm or other vibration constantly to rotation in one direction by a conversion clutch mechanism built in the gear transmission mechanism, it is possible to greatly improve the efficiency of power generation.

Such a converting clutch mechanism is well known as prior art in mechanical self-winding wristwatches as a two-way clutch mechanism, so these known art can be applied. Further, it is also possible to transmit only one of a forward and reverse direction of rotation or swinging of the shaft 9 by the rotary weight 10 to the shaft 8 by a one-way clutch. In this case, motion is no longer inhibited when the shaft 9 of the rotary weight 10 (or shaft 8 of rotary member 4) rotates in reverse, so kinetic energy is no longer wasted and the efficiency of power generation can be raised. The gear transmission mechanism between the rotary member 4 and rotary weight 10 explained above can be suitably applied in the following embodiments as well.

Next, details of the present embodiment will be explained. For the electret material used as a charging film in the present invention, an easily chargeable material is used. For example, as a material charged to the minus side, a silicon oxide ($SiO_2$), fluororesin material, etc. is used. Specifically, as one example, as a minus charged material, there are the fluororesin material made by Asahi Glass, CYTOP® (amorphous fluoropolymer) etc.

Furthermore, in addition, as electret materials, as polymer materials, there are polypropylene (PP), polyethylene terephthalate (PET), polyvinyl chloride (PVC), polystyrene (PS), polytetrafluoroethylene (PTFE), polyvinylidene difluoride (PVDF), polyvinyl fluoride (PVF), etc. As an inorganic material, the above-mentioned silicon oxide ($SiO_2$), silicon nitride (SiN), etc. can be used. In addition, a known charging film can be used.

Referring to FIGS. 7 and 8, the charging film 3 and the counter electrode 2 will be explained. At the inside surface of the charging film 3 (electret film), a negative charge is held, so a positive charge is drawn to the counter electrode 2 by electrostatic induction. The counter electrode 2 provided at the counter substrate 1 and the charging film 3 provided at the bottom surface of the rotary member 4 are formed in patterns such as shown in FIG. 7 and are comprised of radially cut parts 2' and 3' of equal angles from the center formed at equal intervals. In the patterns of FIG. 7, as shown by the perspective view of FIG. 6, the parts between the radially cut parts 3' and 3' are formed by blank spaces. The spaces between the radially cut parts 2', 2' are not provided with electrodes. The counter substrate 1 may be exposed or the counter substrate 1 may be formed with blank spaces. Note that, the parts between the radially cut parts 3', 3' may also be configured not by blank spaces but by light passing members (transparent members). In that case, since printing or relief shapes etc. highlighting the rotation are provided at the window part side of the transparent members, it becomes easy to recognize the state of rotation of the rotary member 4 through the window parts 51 and 52 from the top surface of the watch. Of course, the printing and relief shapes may also be provided at the window part sides (top sides) of the radially cut parts 3'.

The patterns of the charging film and the counter electrode of this FIG. 7 will be referred to as the "first patterns" below. The charging film 3 is formed in patterns comprised of individual radially cut parts 3' and is connected to the shaft 8 of the conductive member through an electrical contact for output of power (is connected to the shaft 8 for each radially cut part 3' or is connected to the shaft 8 after connecting the radially cut parts 3' by wiring). If the rotary member (board) 4 is metal, the radially cut parts 3' are directly connected to the shaft 8 through the board. On the other hand, at the counter electrode as well, the output is taken out from the electrode part at the outer circumference side. The two output terminals are connected to the rectification circuit 20. Regarding the method of taking out current from the shaft 8, it is sufficient to utilize a brush electrode or conductor part of a bearing part for electrical connection while rotating.

If the rotary weight 10 causes the rotary member 4 fastened to the shaft 8 to rotate, the overlapping area of the charging film (electret film) 3 and the counter electrode 2 changes, the positive charge drawn to the counter electrode 2 changes, and alternating current is generated between the charging film (electret film) 3 and counter electrode 2. The current generated between the counter electrode 2 and the charging film 3 is converted to direct current through the rectification circuit 20 and output to the quartz movement 200 as the output part.

The rectification circuit 20 is a bridge type and is provided with four diodes. At the input side, the counter electrode 2 and charging film 3 are respectively connected. At the output side, a not shown power circuit converting this to a predetermined voltage is connected through a smoothening circuit. The generated current converted to direct current at this time is supplied as power to the quartz movement 200 and is stored in the secondary battery 22. The charging film and the counter electrode in the present embodiment are patterned in radially cut shapes, but may also be patterned in other shapes so long as the overlapping area changes at the time of relative rotation of the counter substrate 1 and rotary member 4.

As one example of other patterns, unlike the patterns shown at the bottom part of FIG. 7, as shown in the bottom part of FIG. 8, it is also possible to make the radially cut parts 2' of the counter electrode 2 on the counter substrate 1 respectively independent, make the every other radially cut parts 2' connected, make them two terminals, and connect them to the input side of the rectification circuit 20. The patterns of the charging film 3 of the top part of FIG. 8 are the same as the case of the top part of FIG. 7, but the output terminal of the top part of FIG. 8 becomes unnecessary. (See the explanation of the principle of the embodiment of FIGS. 9 and 10 of PLT 5. PLT 5 is incorporated by reference.) In this case, it is sufficient to take out current from only the counter electrode 2 of the stationary counter substrate 1, so electrical connection of the turning rotary members becomes unnecessary. This is convenient.

Here, the patterns of the radiating parts 2' of the counter electrode 2 on the counter substrate 1 shown at the bottom of FIG. 8 and the patterns of the charging film 3 shown at the top of FIG. 8 will be referred to as "the second patterns" below. Note that, the parts between the radially cut parts 3', 3' may be formed by light passing members rather than blank spaces. In that case, since printing or relief shapes etc. highlighting rotation are provided at the window part sides of the transparent members, it becomes easy to recognize the state of rotation of the rotary member 4 from the top surface of the watch through the window parts 51 and 52. Of course, the printing or relief shapes may also be provided at the window part sides (top sides) of the radially cut parts 3'.

In the first embodiment, a rotary member is arranged directly right below the window parts 51 and 52 of the dial plate 25 and the main plate 33. Further, the charging film 3 is set below the rotary member 4, so the charging film 3 does not directly receive the outside light from the window parts 51 and 52 and deterioration of the charging film is not caused, so either the "first patterns" of FIG. 7 or the "second patterns" of FIG. 8 can be used to work the invention. However, in the later explained embodiments, the orders of arrangement of the members differ. Depending on the circumstance in visual confirmation of the rotary member 4 or shielding of the charging film 3 from outside light, the invention will sometimes be limited to one of the patterns, but usually both can be applied.

In the present embodiment, at the bottom surface of the rotary member 4, a charging film 3 is arranged. The charging film 3 is at the opposite side from the window parts 51 and 52. For this reason, outside light is not directly received from the window parts 51 and 52, so deterioration of the charging film 3 can be prevented. If the parts of the rotary member 4 other than the charging film are formed by blank spaces, the state of rotation can be clearly confirmed visually through the window parts 51 and 52, so the user can recognize the state of power generation. The detailed process of fabrication of the watch will be explained later, but in the present embodiment, the shaft 8, rotary member 4, and counter electrode 2 have to be properly positioned when assembling them into the watch. In particularly, fine adjustment becomes necessary, since the gap between the charging film 3 and counter electrode 2 has an effect on the power generating characteristics. Therefore, in the first patterns, when the portions positioned between the radially cut parts 3', 3' of the rotary member 4 and between the radially cut parts 2', 2' of the counter substrate 1 are blank spaces or transparent members, it becomes possible to make adjustments while viewing the mutual positions and state from the case back 42 side of the watch or protective glass 24 side of the watch. Due to this, it is possible to simplify the adjustment process. In this adjustment work, there is no need to form the portions positioned between all radially cut parts 3', 3' and between the radially cut parts 2', 2' of the counter substrate 1 by blank spaces or transparent members. It is also possible to provide windows made of blank spaces or transparent members enabling mutual positions to be confirmed at just parts of the same.

Second Embodiment

The second embodiment of the present invention has the counter electrode 2 placed on the bottom surface of the rotary member 4 in the first embodiment of FIG. 3 instead of the charging film 3, and has the charging film 3 placed on the top surface of the counter substrate 1 instead of the counter electrode 2. The rest of the configuration is similar to the first embodiment. Therefore, in the present embodiment, the window part 51 of the dial plate 25, the window part 52 of the main plate 33, rotary member 4, counter electrode 2, charging film 3, counter substrate 1, and bridge 34 are arranged in that order from the top part toward the bottom part. For the patterns of the counter electrode 2 and charging film 3, the first patterns of FIG. 7 are employed. The counter electrode 2 takes out an output terminal from the shaft 8 to which the rotary member 4 is fastened and takes out an output terminal from the charging film 3 set on the top surface of the stationary counter substrate 1.

In the present embodiment, the charging film 3 is arranged on the top surface of the counter substrate 1, so is exposed to outside light from the direction of the window parts 51 and 52. For this reason, in the present embodiment, the following configuration can be employed. When employing the first patterns of FIG. 7 and there are blank spaces at the rotary member 4, the charging film 3 may be coated with a light shielding paint. As the light shielding paint, it is sufficient to coat a UV cutting material to a thickness of several microns or so or more. On the other hand, light can pass even if making the rotary member 4 non-light passing and not providing blank spaces so that outside light does not pass through from the blank spaces. In this case, the window part side of the rotary member 4 may also be provided with printing, relief shapes, etc. for highlighting the rotation. Even if the rotary member 4 passes light, a non-light passing material may be used to form the counter electrode 2 so as to prevent light from passing through the entire surface of the counter electrode 2.

In the present embodiment as well, the rotating state can be visually confirmed through the window parts 51 and 52, so the user can confirm the state of power generation and direct outside light can be prevented from striking the charging film 3. In the first patterns, when the parts positioned between the radially cut parts 3', 3' of the rotary member 4 and between the radially cut parts 2', 2' of the counter substrate 1 are made blank spaces or transparent members, it becomes possible to adjust the gap or perform other adjustment work while viewing the mutual positions between the two and the status from the case back 42 side of the watch or the protective glass 24 side of the watch and possible to simplify the adjustment process. For this purpose, it is sufficient to provide a window made of a blank space or a transparent member at the rotary member 4 and part of the counter substrate 1 so as to enable confirmation of their mutual positions.

Figure 9:
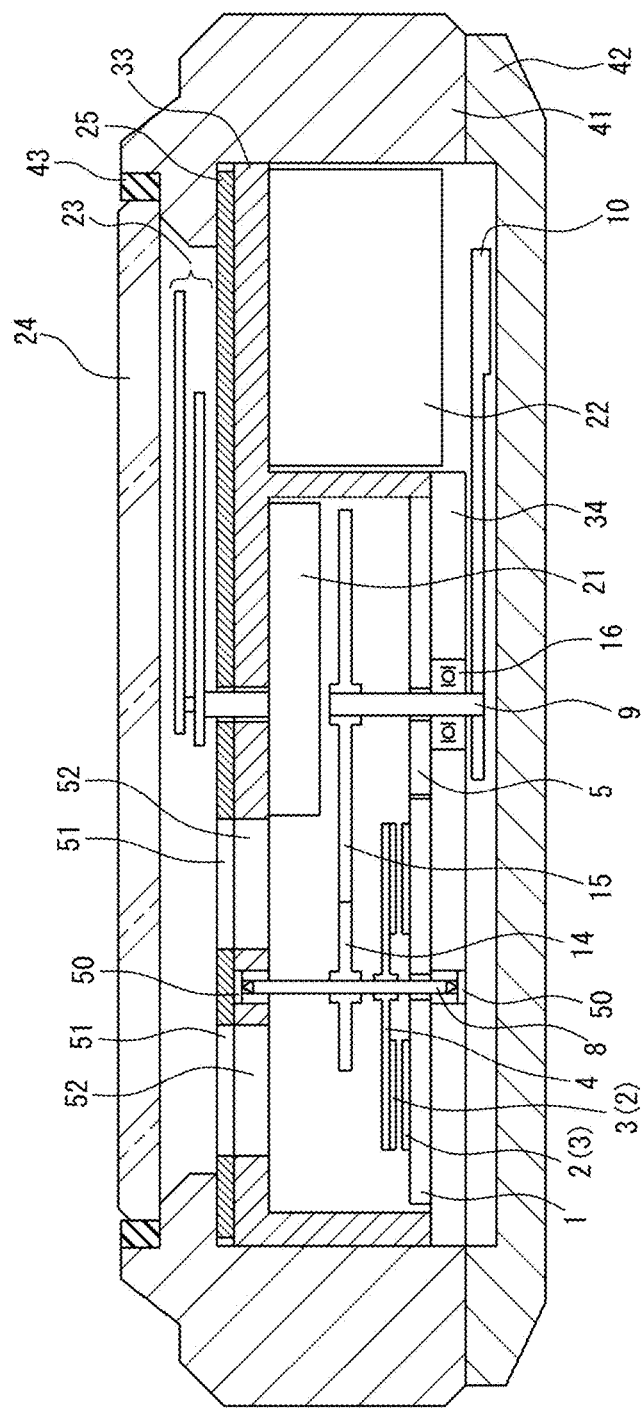
FIG. 9 is a schematic cross-sectional view in the case of changing a position of arrangement of a gear transmission mechanism in the first and second embodiments of the present invention.

FIG. 9 is a schematic cross-sectional view in the case of changing the position of arrangement of the gear transmission mechanism in the first and second embodiments of the present invention.

In the first and second embodiments of FIG. 3 explained up to here, at the bottom side of the counter substrate 1 from the shaft 8, a gear 14 fastened to the shaft 8 and a gear 15 fastened to the shaft 9 had been provided, as the gear transmission mechanism from the rotary weight 10 fastened to the shaft 9, to the shaft 8. As opposed to this, in the case of FIG. 9, as the gear transmission mechanism from the rotary weight 10 fastened to the shaft 9 to the shaft 8, a gear 14 fastened to the shaft 8 and a gear 15 fastened to the shaft 9 are provided between the window part 52 of the main plate 33 and the rotary member 4. The counter substrate 1 is set at the bridge 34, so even when the counter substrate 1 ends up warping, it is straightened to the flatness of the bridge 34, so assembly and adjustment become easy. The rest of the configuration is similar to the first and second embodiments explained previously.

Third Embodiment

Figure 10:
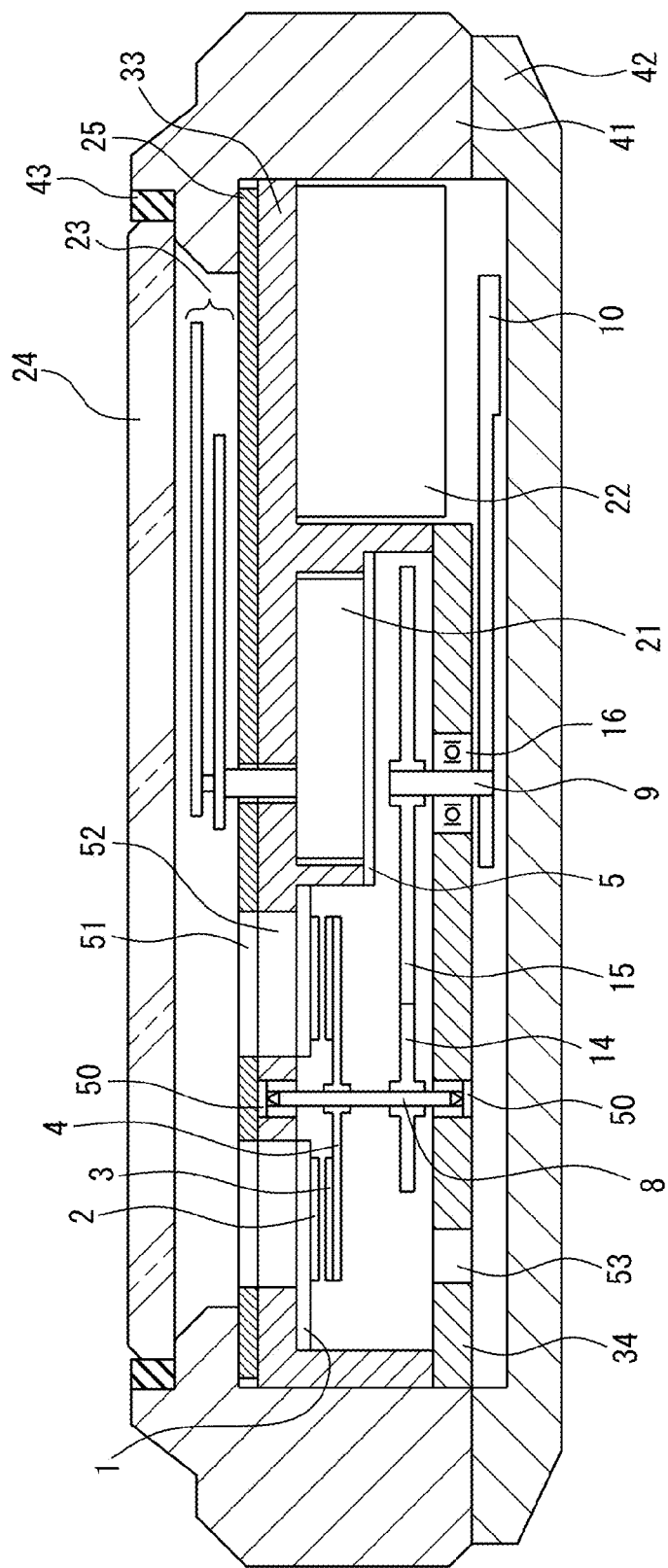
FIG. 10 is a schematic cross-sectional view showing a third embodiment of the present invention. With the exception of part of the layout, this also shows a fourth embodiment of the present invention.

FIG. 10 is a schematic cross-sectional view showing a third embodiment of the present invention.

Referring to FIG. 10, the configuration of an electrostatic induction generator will be explained. The difference from the first and second embodiments explained up to here is the point of provision of the counter substrate 1 at the window part 52 side. For this reason, the counter substrate 1 is made a glass or other light passing member. For the counter electrode 2, a light passing indium tin oxide film (ITO film) or other transparent electrode is used. Due to this, it is possible to visually confirm the rotation of the rotary member through the window part 51 of the dial plate 25 and the window part 52 of the main plate 33. The rest of the configuration is similar to the first embodiment explained previously.

After the window part 52 of the main plate 33, the counter substrate 1 is placed and set (while explained later, conveniently at the time of assembly). In the present embodiment, the counter electrode 2 is placed on the bottom surface of the counter substrate 1. Both the counter substrate 1 and the counter electrode 2 are light passing and enable the inside to be visually confirmed from the window parts 51 and 52. Note that, if both the counter substrate 1 and the counter electrode 2 have blank spaces, the inside can be visually confirmed even without both necessarily passing light. The rotary member 4 is fastened to the shaft 8. At the top surface of the rotary member 4, the charging film 3 is placed. Outside light enters through the window parts 51 and 52, so the charging film 3 is coated with light shielding paint. By doing this, direct light is not received from the window parts 51 and 52, so deterioration of the charging film 3 can be prevented. The patterns of the charging film and the counter electrode can be applied together with the first and the second patterns.

The circuit board 5 of the quartz movement 200, like the counter substrate, is set and fastened on the main plate 33. If the rotary member 4 rotates, power is generated by electrostatic induction. The power generated between the charging film 3 and the counter electrode 2 is output to the quartz movement 200 (circuit board 5). In the embodiment of FIG. 10, the counter substrate 1 is electrically connected with the circuit board 5 through a connector, conductive springs, connection terminals, etc. Power is supplied from the counter substrate 1 is supplied through this connector, conductive springs, connection terminals, etc. to the circuit board 5 to drive the quartz movement 200 and charge the secondary battery 22.

In the present embodiment, the window part 51 of the dial plate 25, the window part 52 of the main plate 33, counter substrate 1, counter electrode 2, charging film 3, rotary member 4, and bridge 34 are arranged in that order from the top part toward the bottom part. At the bottom side of the rotary member 4 from the shaft 8, a gear 14 fastened to the shaft 8 and a gear 15 fastened to the shaft 9 are provided, as a gear transmission mechanism from the rotary weight 10 fastened to the shaft 9, to the shaft 8.

Figure 11:
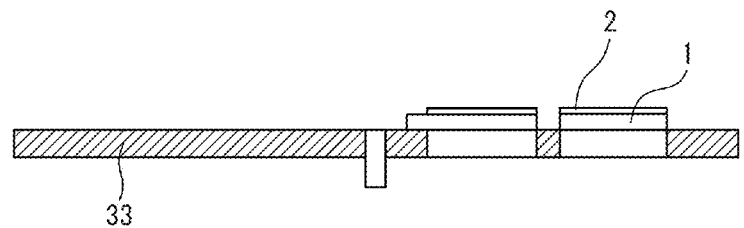
FIG. 11 is an explanatory view for explaining assembly steps (a) to (d) of a third embodiment of the present invention.
Figure 11:
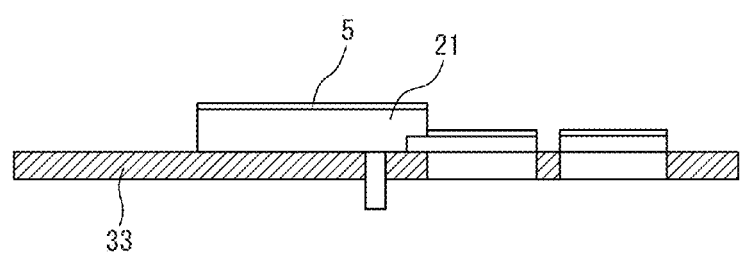
Figure 11:
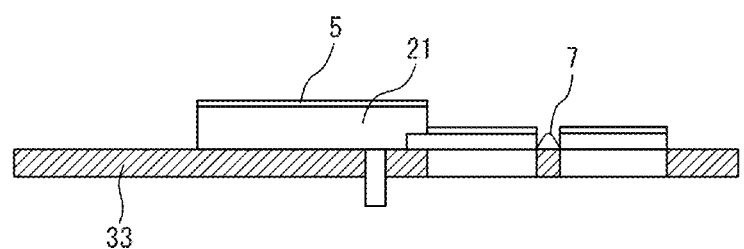
Figure 11:
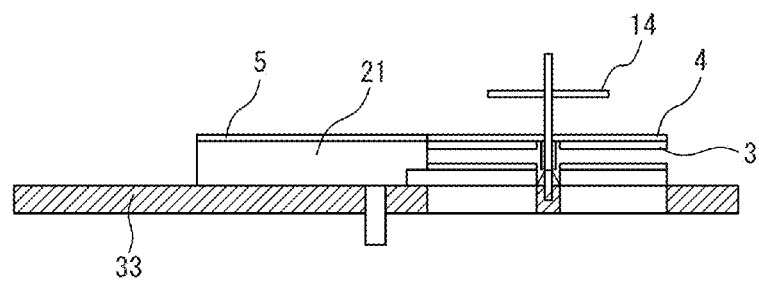
Figure 12:
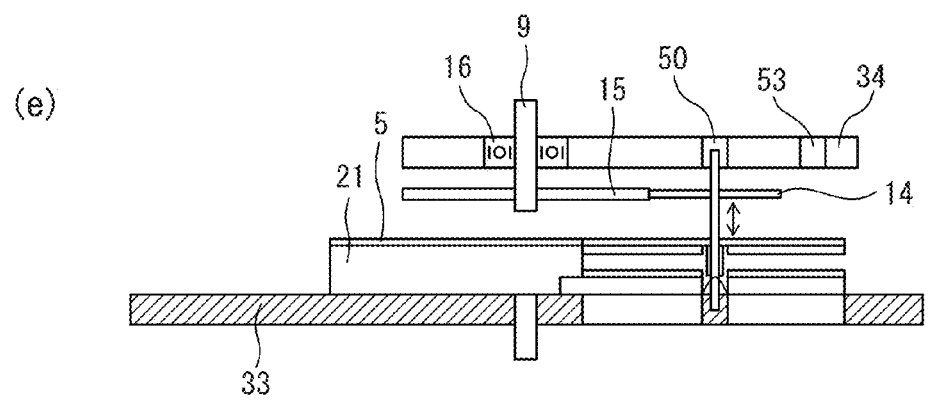
FIG. 12 is an explanatory view for explaining assembly steps (e) to (g) of the third embodiment of the present invention.
Figure 12:
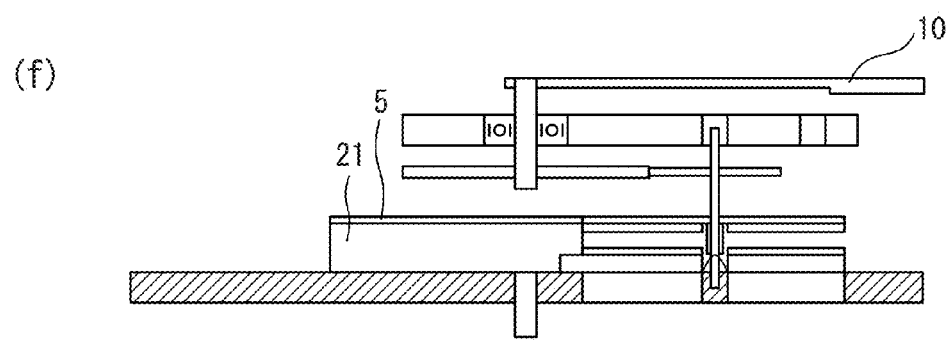
Figure 12:
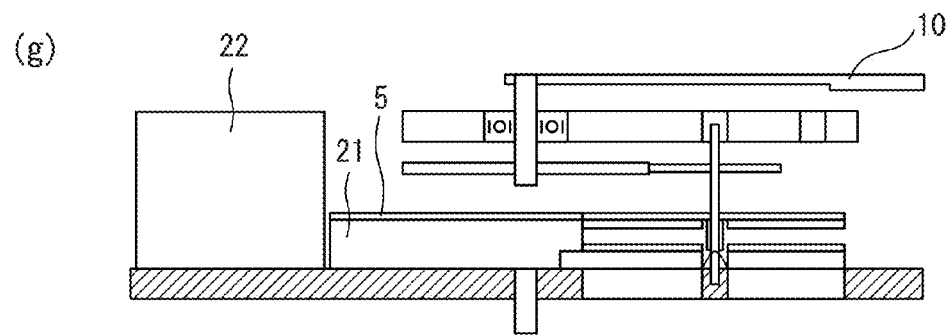

FIG. 11 is an explanatory view for explaining assembly steps (a) to (d) of a third embodiment of the present invention. FIG. 12 is an explanatory view for explaining assembly steps (e) to (g) of the third embodiment of the present invention. In FIGS. 11 and 12, parts of the main plate 33 and other parts are omitted for the explanation and the process is schematically shown for facilitating understanding.

Normally, as the direction of assembly of a watch, the parts are assembled with the dial plate side of the main plate 33 facing down, so the main plate 33 is at the bottom side. The counter substrate 1, rotary member 4, and bridge 34 are assembled in that order, then the operating state of the rotary member 4 is confirmed. For this reason, assembling the counter substrate 1 and the rotary member 4 in order from the bottom first enables determination of the adjustment of the gap between the counter electrode 2 and the charging film 3 (extremely important in terms of efficiency of power generation by electret film), so arrangement of the main plate 33, counter substrate 1, counter electrode 2, charging film 3, rotary member 4, and bridge 34 in that order like in the present embodiment (or arrangement of the main plate 33, counter substrate 1, charging film 3, counter electrode 2, rotary member 4, and bridge 34 in that order in the later explained fourth embodiment) is advantageous in terms of the work process. A work confirming window 53 enabling confirmation of the state of installation of the rotary member and state of operation of the same at the time of assembly to the bridge 34 becomes necessary.

Referring to FIGS. 11 and 12(a) to (g), the following assembly steps (a) to (g) of the present embodiment will be explained.

(a) The counter substrate 1 at which the counter electrode 2 is set is assembled into the main plate 33.

(b) The quartz movement (gear drive part 21, circuit board 5, etc.) is assembled and the circuit board 5 and the counter substrate 1 are electrically connected.

(c) A spring 7 is set for pulling (pushing) the rotary member 4 upward.

(d) The rotary member 4 with the charging film 3 set at its bottom surface is inserted into a hole provided in the spring 7. At this time, it is confirmed that the charging film 3 of the rotary member and the counter electrode 2 of the counter substrate do not contact.

(e) The rotary weight 10 and the gear 15 are fastened to the shaft 9, then the shaft 9 is integrally connected with the bridge 34 while supported by the bearing. The bridge 34 is provided with a bearing 50 supporting the shaft 8 to which the rotary member 4 is attached. By engaging the gear 15 with the gear 14 fastened to the shaft 8 while adjusting the height of the bearing 50, the gap between the charging film 3 of the rotary member and the counter electrode 2 of the counter substrate is adjusted. At this time, it is possible to adjust the gap while viewing the status through the work confirming window 53. If the charging film 3 and the counter substrate 1 contact, the charge ends up escaping and the amount of power carried decreases, so care is necessary that they do not contact.

(f) The rotary weight is attached.

(g) The secondary battery 22 is placed on the main plate 33.

In the present embodiment as well, the user can visually confirm the state of rotation through the window parts 51 and 52, so the user can confirm the state of power generation. Further, according to the present embodiment, adjustment of the gap between the charging film 3 of the rotary member 4 and the counter electrode 2 of the counter substrate 1 at the time of assembly is advantageous in terms of the work process. First ending the adjustment of the gap between the charging film 3 and the counter electrode 2 and then assembling the gear 15 etc. is advantageous in terms of work. Therefore, if first setting the counter substrate 1 at the dial plate side of the main plate 33 at the time of assembly, the charging film (electret) 3 can be easily assembled. Furthermore, since the bridge 34 is set with a work confirming window 53, it is possible to confirm the state of installation and state of operation of the rotary member at the time of assembly.

Fourth Embodiment

The fourth embodiment of the present invention sets the charging film 3 instead of the counter electrode 2 at the bottom surface of the counter substrate 1 at the third embodiment of FIG. 10 and sets the counter electrode 2 instead of the charging film 3 at the top surface of the rotary member 4. Therefore, in the present embodiment, the window part 51 of the dial plate 25, the window part 52 of the main plate 33, counter substrate 1, charging film 3, counter electrode 2, rotary member 4, and bridge 34 are arranged in that order from the top part toward the bottom part.

In the third embodiment, the counter substrate 1 and the counter electrode 2 were both light passing and were designed to enable the inside to be viewed from the window parts 51 and 52. In the fourth embodiment, the counter substrate 1 is directly arranged right under the window parts 51 and 52. Further, at the bottom part of the counter substrate 1, a charging film 3 is set. For this reason, the counter substrate 1 is made non-light passing and radially cut blank spaces are provided to enable the operating state of the rotary member 4 to be viewed through the blank spaces. In this case, the first patterns of FIG. 7 are employed. Since the charging film 3 is set at the bottom of the non-light passing counter substrate 1, the charging film 3 does not directly receive outside light from the window parts 51 and 52. The counter electrode 2 is set at the top part of the rotary member. Note that, the rotary member 4 can be formed even without providing the blank spaces. In that case, the window part sides of the rotary member 4 may be provided with printing or relief shapes etc. highlighting the rotation. In the present embodiment as well, adjusting the gap between the charging film 3 of the rotary member 4 and the counter electrode 2 of the counter substrate 1 at the time of assembly is advantageous in the work process. The rest of the configuration and effects are similar to the third embodiment.

Fifth Embodiment

Figure 13:
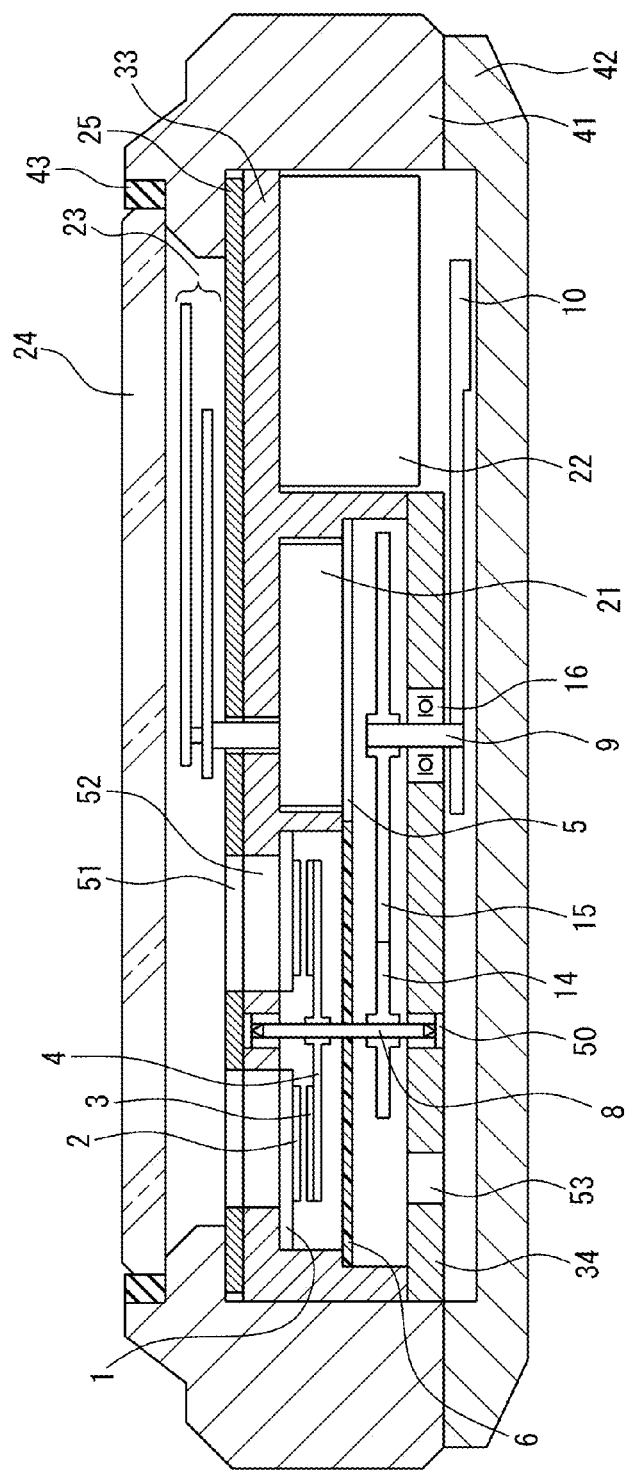
FIG. 13 is a schematic cross-sectional view showing one example of a fifth embodiment of the present invention.
Figure 14:
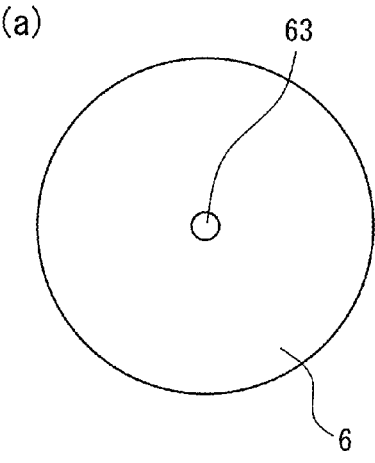
FIG. 14 is a schematic plan view showing solar cell modules (a) to (c) of the fifth embodiment of the present invention.
Figure 14:
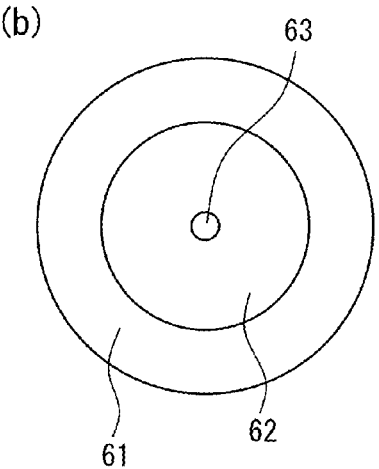
Figure 14:
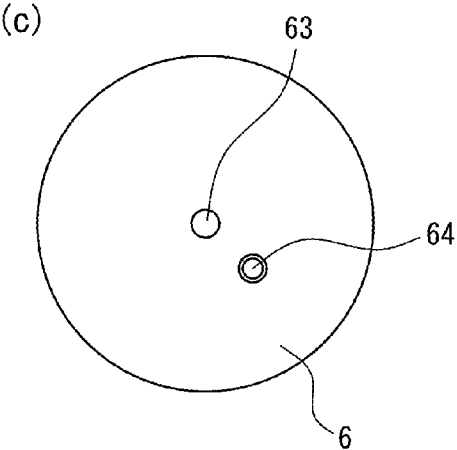

FIG. 13 a schematic cross-sectional view showing one example of a fifth embodiment of the present invention. FIG. 14 is a schematic plan view showing solar cell modules (a) to (c) of the fifth embodiment of the present invention.

FIG. 13 is one example of a fifth embodiment setting a solar cell module 6 below the rotary member 4 in the third embodiment of FIG. 10. Without limitation to the example of FIG. 13, in each embodiment in this Description, it is possible to set the solar cell module 6 (also referred to as "first solar cell module") so that it is irradiated with outside light from the window part.

In the case of the third embodiment, the counter substrate 1 and the counter electrode 2 both pass light so that the outside light from the window parts 51 and 52 are not blocked by the counter substrate 1. Further, in the case of the fourth embodiment, the counter substrate 1 is made a non-light passing material and radially cut blank spaces are provided to enable outside light to pass through the blank spaces. Therefore, the outside light is utilized for power generation at the solar cell module 6 set below the rotary member 4. The solar cell module 6 is a single solar cell. As shown in FIG. 14(*a*), in the case of a single solar cell, rotation of the rotary member 4 with the radial cut blank spaces does not cause any change in the amount of power generation, so this is preferable. The number of solar cells means the number of solar cells connected in series. As shown in FIG. 14(*a*), when made a single cell, the voltage of power generated from the solar cell module 6 will not reach the operating voltage of the watch, so the voltage is preferably boosted in level. Reference notation 63 is a through hole of a shaft 8.

Further, as shown in FIG. 14(*b*), multiple solar cells may be provided in concentric shapes to enable high voltage to be stably generated. Since they are concentric shapes, the amount of power generation does not change even due to rotation of the rotary member 4 with the radially cut blank spaces. In this case, it is preferable to make the areas of the solar cells 61 and 62 the same and make the outputs of the solar cells 61 and 62 become maximum. Further, as shown in FIG. 14(*c*), the solar cell module 6 is provided with an independent rotation detecting solar cell 64. In this case, it is also possible to detect the rotating state of the rotating electrode, to lower the voltage for charging of the power generated from the charging film (electret) 3 and the counter electrode 2 when the rotary member is operating, and, when the rotary member 4 has stopped, to charge from the solar cell module 6 (of course, it is also possible to charge from the solar cell module 6 without regard as to stopping of the rotary member 4). Providing the rotation detecting solar cell 64 and detecting the rotating state of the rotating electrode, saves installation of a vibration sensor, enables utilization for judgment of the carried state of the watch, and can be used for controlling the power saving state of the watch. In this way, in the present embodiment, the number of the cells of the first solar cell module may be single cells or multiple cells. In the case of multiple cells, the different solar cells are formed in concentric shapes. Further, the first solar cell module may be provided with a rotation detecting solar cell for detecting rotation of the rotary member.

The fifth embodiment was described mainly using the third embodiment, but clearly may also be applied to the fourth embodiment. If considering the amount of light received of the solar cell module 6, the third embodiment is preferable. The reason why is that in the case of the third embodiment, the counter substrate 1 and the counter electrode are made of light passing materials. The only light passing member is the rotary member 4. In the case of the fourth embodiment, the counter substrate 1 and the rotary member 4 provided with the blank spaces are light shielding members, so the amount of light received of the solar cell module 6 is smaller than the third embodiment. When using the first embodiment, if making the counter electrode 2 and the counter substrate 1 a light passing electrode and substrate in the same way as the third embodiment, it is possible to set the solar cell module 6 below them, so the fifth embodiment can be realized. Further, when using the second embodiment, if forming the blank spaces of the rotary member from light passing members, holes, etc., coating the charging film 3 on the counter substrate 1 with a light shielding paint, and making the radially cut non-charging film parts from light passing members, blank spaces, etc., the fifth embodiment becomes possible. The fifth embodiment can be applied in the same way as the later explained embodiments.

Sixth Embodiment

Figure 15:
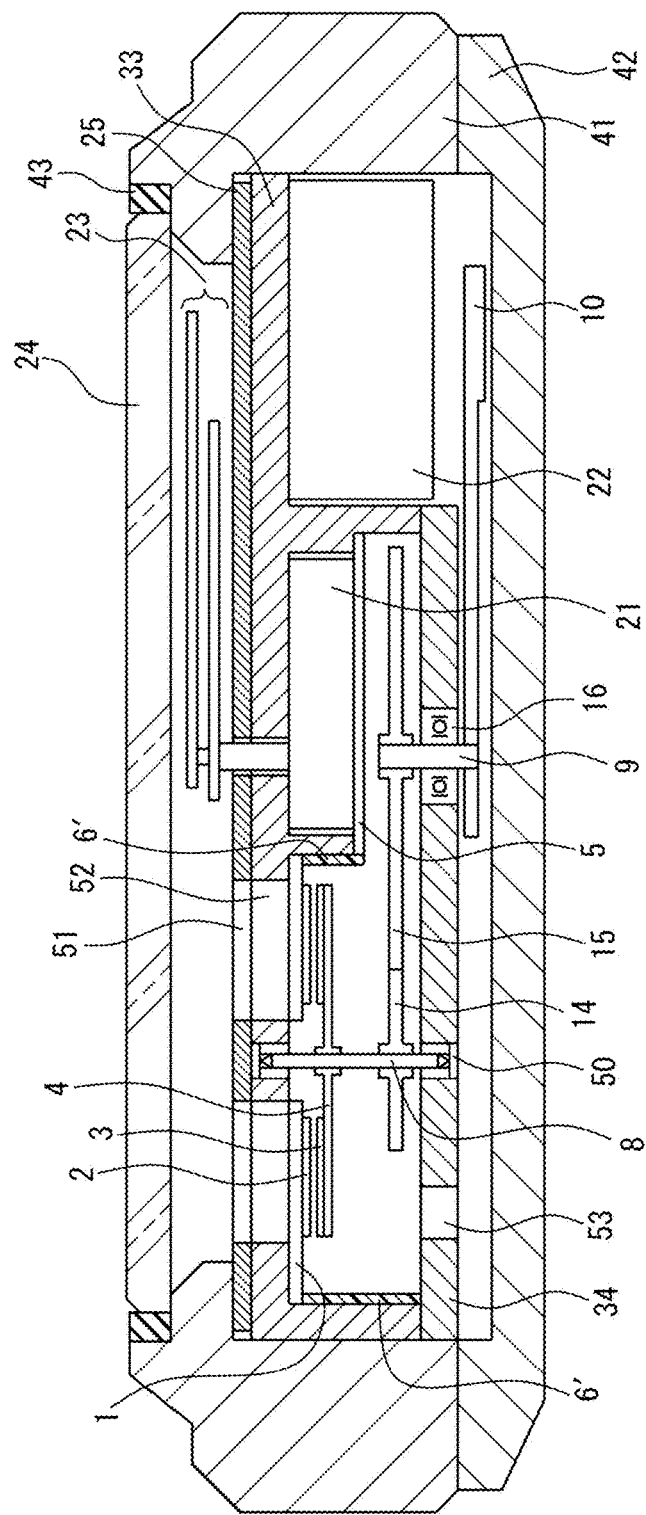
FIG. 15 is a schematic cross-sectional view showing one example of a sixth embodiment of the present invention.

FIG. 15 is a schematic cross-sectional view showing one example of a sixth embodiment of the present invention.

FIG. 15 is one example of the sixth embodiment providing a ring-shaped solar cell module 6' at the side of the rotary member 4 in the third embodiment of FIG. 10. The invention is not limited to the example of the ring shape of FIG. 15. In all embodiments in this description, it is possible to set the solar cell module 6' (also referred to as the "second solar cell module") at the inside lateral surface of the main plate 33 so that it is struck by outside light from the window part.

The sixth embodiment sets the solar cell module 6' around the rotary member of the third embodiment in the radial direction and improves the power generation ability in the same way as the fifth embodiment. If connecting a plurality of solar cells in series, a solar cell with a small amount of power generation ends up causing a large drop in the overall amount of power generation. Therefore, the number of cells of the solar cell module 6' is preferably made a single cell since the incident angle of light causes a difference to appear in the amount of light received. In the case of the fourth embodiment providing blank spaces at the counter substrate 1, arranging the solar cell module at the side surface like in the sixth embodiment enables light from the window parts 51 and 52 to stably strike the solar cell module 6' at the side surface, so the solar cell module 6' is preferably at the side surface. The sixth embodiment enables further power to be obtained if jointly used with the fifth embodiment. Further, by treating the gears 14, 15 or bridge 34 and other portions which light from the window parts 51 and 52 would reach at their surfaces for reflection and scattering, the amount of light received by the solar cell module 6' can be improved and the amount of power generation can be increased. Even if setting a plate for the purpose of reflection and scattering between the rotary member 4 and the gear 14, effects similar to the above can be obtained. Further, in FIG. 15, the sixth embodiment was explained using the third embodiment, but the invention is not limited to this. It may also be applied to all of the embodiments described in this description. It is effective to arrange the ring-shaped solar cell module 6' of the solar cell 6' so as to give it the role of a light shielding wall so that outside light does not strike the IC of the circuit board 5 etc.

Seventh Embodiment

Figure 16:
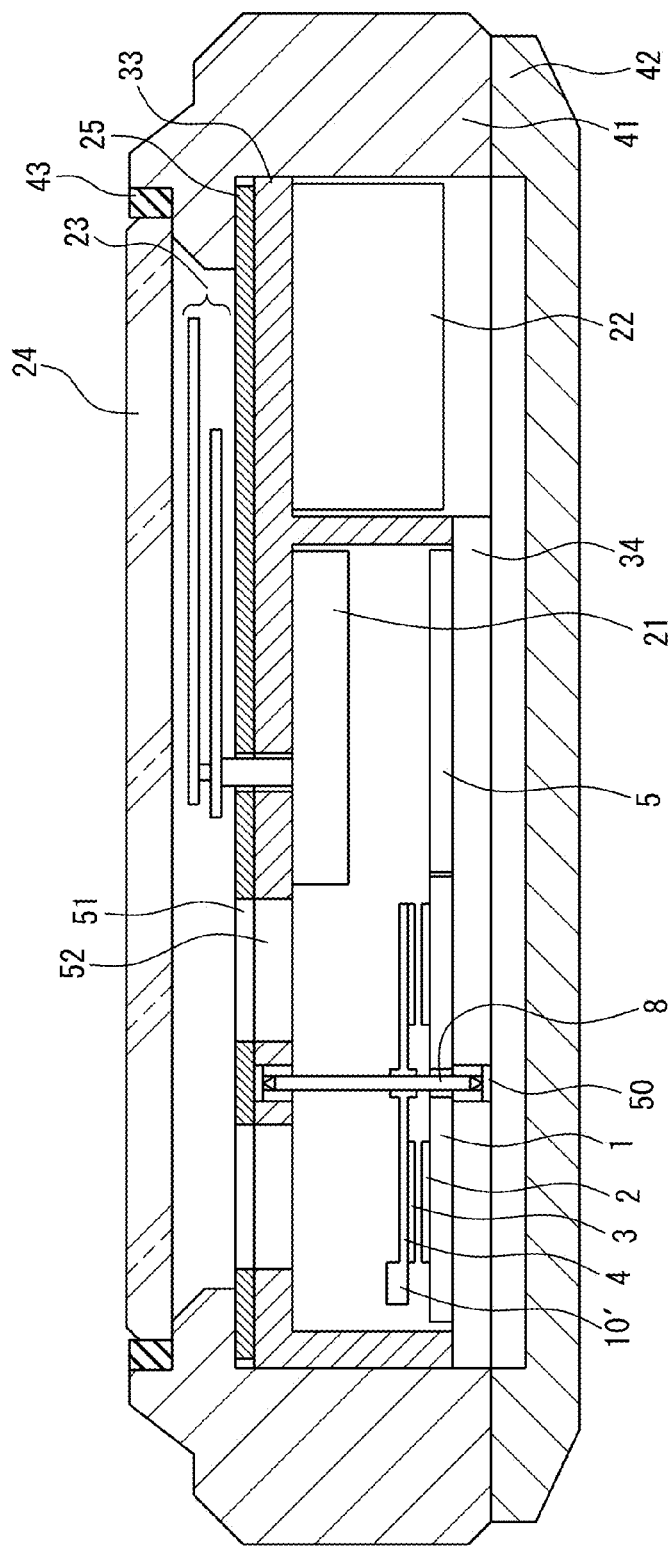
FIG. 16 is a schematic cross-sectional view showing a seventh embodiment of the present invention.

FIG. 16 is a schematic cross-sectional view showing a seventh embodiment of the present invention.

The present embodiment is an embodiment with a rotary weight 10' (added weight) formed integrally with the rotary member 4. That is, the present embodiment is characterized by forming the rotary member and the rotary weight integrally. Therefore, there is no need to provide a separate rotary weight 10 or gear transmission mechanism. Assembly is easy and the watch can be made an extremely thin structure. The rotary weight 10' is set in the vicinity of the rotary member, so does not obstruct visual confirmation of movement of the rotary member directly under the window parts 51 and 52 of the dial plate 25 and the main plate 33. The counter substrate 1 and the circuit board 5 are provided on the bridge 34. The rest of the configuration is similar to the first embodiment. In FIG. 16, the charging film 3 is set at the bottom surface of the rotary member 4, while the counter electrode 2 is set at the top surface of the counter substrate 1, but of course even the case where the charging film 3 and the counter electrode 2 are oppositely arranged is included in this embodiment. In the present embodiment as well, the state of rotation of the rotary member 4 can be visually confirmed through the window parts 51 and 52, so the user can recognize the state of power generation. Unlike the above embodiments, it is also possible to set a separate rotary weight 10 at the shaft 8 above the rotary member 4. This is included in the present invention. That is, the shaft of the rotary member may be provided with the rotary weight.

Eighth Embodiment

Figure 17:
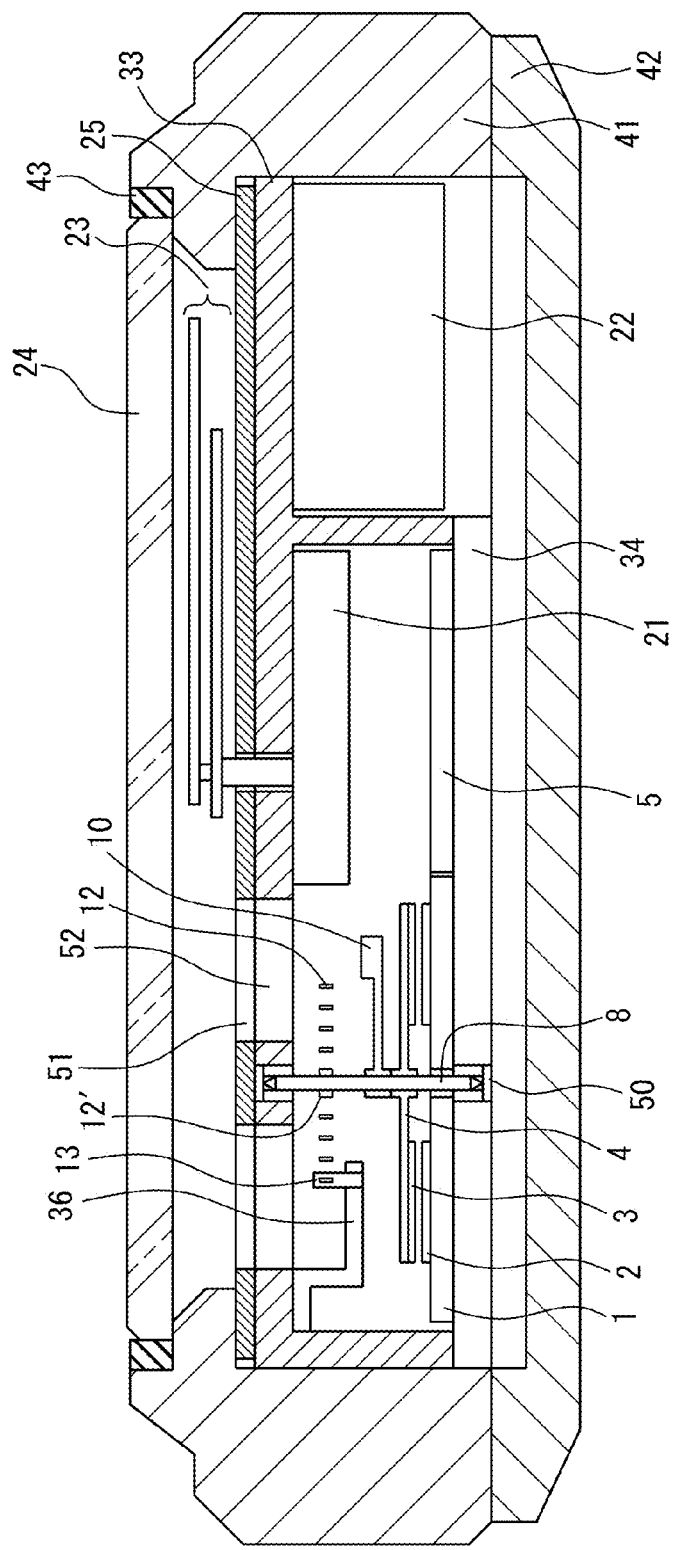
FIG. 17 is a schematic cross-sectional view showing an eighth embodiment of the present invention.

FIG. 17 is a schematic cross-sectional view showing an eighth embodiment of the present invention.

The present embodiment separately fastens a semicircular rotary weight 10 and rotary member 4 to the shaft 8, sets a hairspring 12 (watchmaker's term, spiral spring) between the shaft 8 and the main plate 34, and uses vibration of the rotary weight 10 to make the hairspring 12 bend and enlarge the amplitude of rotation of the rotary member 4 to improve the efficiency of power generation. That is, the present embodiment is characterized in that one end of the hairspring is fastened to the housing, while the other end of the hairspring is fastened to the shaft of the rotary member. In the same way as the seventh embodiment, it is possible to make a rotary member with an integral rotary weight.

The charging film 3 is arranged at the bottom surface of the rotary member 4. On the other hand, a counter electrode 2 is arranged on the counter substrate 1 so as to face the charging film 3. The counter substrate 1 and placed on and fastened to the bridge 34. If the rotary member 4 rotates, electrostatic induction generation is caused and the electric power generated between the charging film 3 and counter electrode 2 is output to the quartz movement 200. The shaft 8 is supported by top and bottom shock protection systems 50 (here, parashocks) provided at the main plate 33 and bridge 34. The hairspring 12 is fastened at one end by a stud 13 set at a bracket 36 sticking out from the main plate 33. The other end of the hairspring 12 is fastened to the shaft 8 by a hairspring collet 12' by press-fitting or crimping.

The circuit board 5 is also set on the bridge 34. The rest of the configuration is the same as in the first embodiment. In FIG. 17, the charging film 3 is set at the bottom surface of the rotary member 4, while the counter electrode 2 is set at the top surface of the counter substrate 1, but of course even the case where the charging film 3 and counter electrode 2 are oppositely arranged is included in this embodiment. In the present embodiment as well, the state of rotation of the rotary member 4 can be visually confirmed through the window parts 51 and 52, so the user can confirm the state of power generation.

Ninth Embodiment

Figure 18:
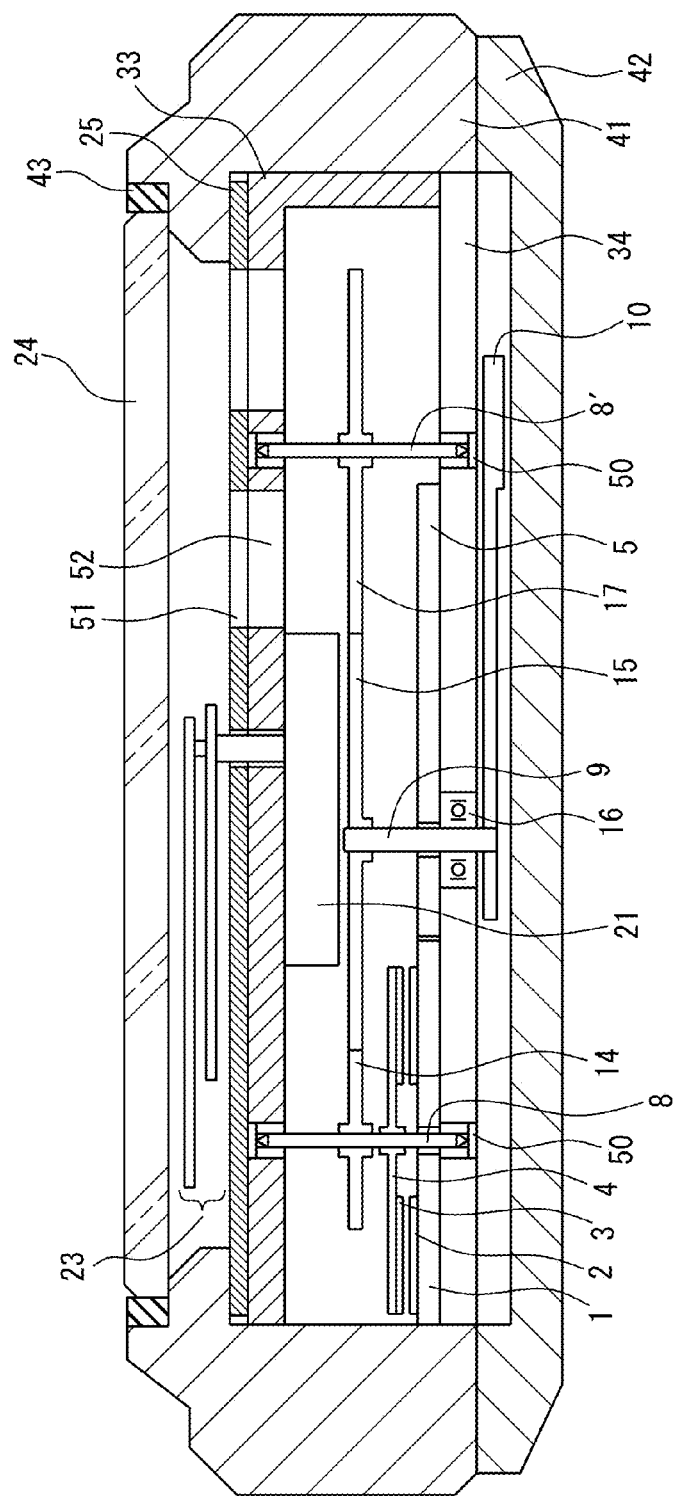
FIG. 18 is a schematic cross-sectional view showing a ninth embodiment of the present invention.

FIG. 18 is a schematic cross-sectional view showing a ninth embodiment of the present invention.

The ninth embodiment differs from the embodiments explained up to here. As shown in FIG. 18, rotation of the rotary member 4 can be visually confirmed by transmission of that rotation (rotary body 17) through the gear transmission mechanism from the window parts 51 and 52.

Above the rotary member 4, a gear 14 fastened to the shaft 8 and a gear 15 fastened to the shaft 9 are provided. Furthermore, a gear 17 engaging with the gear 15 is fastened to the shaft 8'. Rotation of the rotary member 4 is transferred to the gear 17 by the gears 14, 15, and 17 forming the gear train. The method of forming this gear train should be suitably set by the layout inside the housing, so is not limited to the embodiment of FIG. 18. The gear 17 (rotary body) is set at a position where it can be visually confirmed well from the window parts 51 and 52. Due to this, even if outside light enters through the window parts 51 and 52, it becomes easy to prevent the outside light from striking the charging film 3 inside of the electrostatic induction power generator by setting it at a location deep from the window parts 51 and 52 or shielding it by a wall.

In the present embodiment, rotation of the rotary weight 10 is transmitted through the shaft 9 to the shaft 8 and the shaft 8', but instead of the shaft 9, it is also possible to fasten a rotary weight 10 to the shaft 8' and transmit rotation to the rotary member 4 in the order of the gears 17, 15, and 14 (or 17 and 14). Further, rotation of the rotary weight 10 can be visually checked from the window parts 51 and 52. The other members are configured in the same way as the first and second embodiments etc. explained above.

In the present embodiment, the state of rotation of the rotary member 4 can be visually confirmed through the window parts 51 and 52 as rotation of the gear due to transmission of rotation (or rotation of the rotary weight 10), so the user can confirm the state of power generation. Further, since light is not directly received from the window parts 51 and 52, deterioration of the charging film 3 can be prevented and the charging film can be easily and completely shielded. Printing or relief shapes etc. for highlighting rotation may also be provided at the window part sides of the gear 17 etc. Further, the circuit board 1 may also be set at a location deeper than the window parts 51 and 52 or may be shielded by a wall so that outside light does not strike it. Due to this, the IC on the circuit board can be shielded from light, so an increase in power consumption and mistaken operation can be avoided.

10th Embodiment

Figure 19:
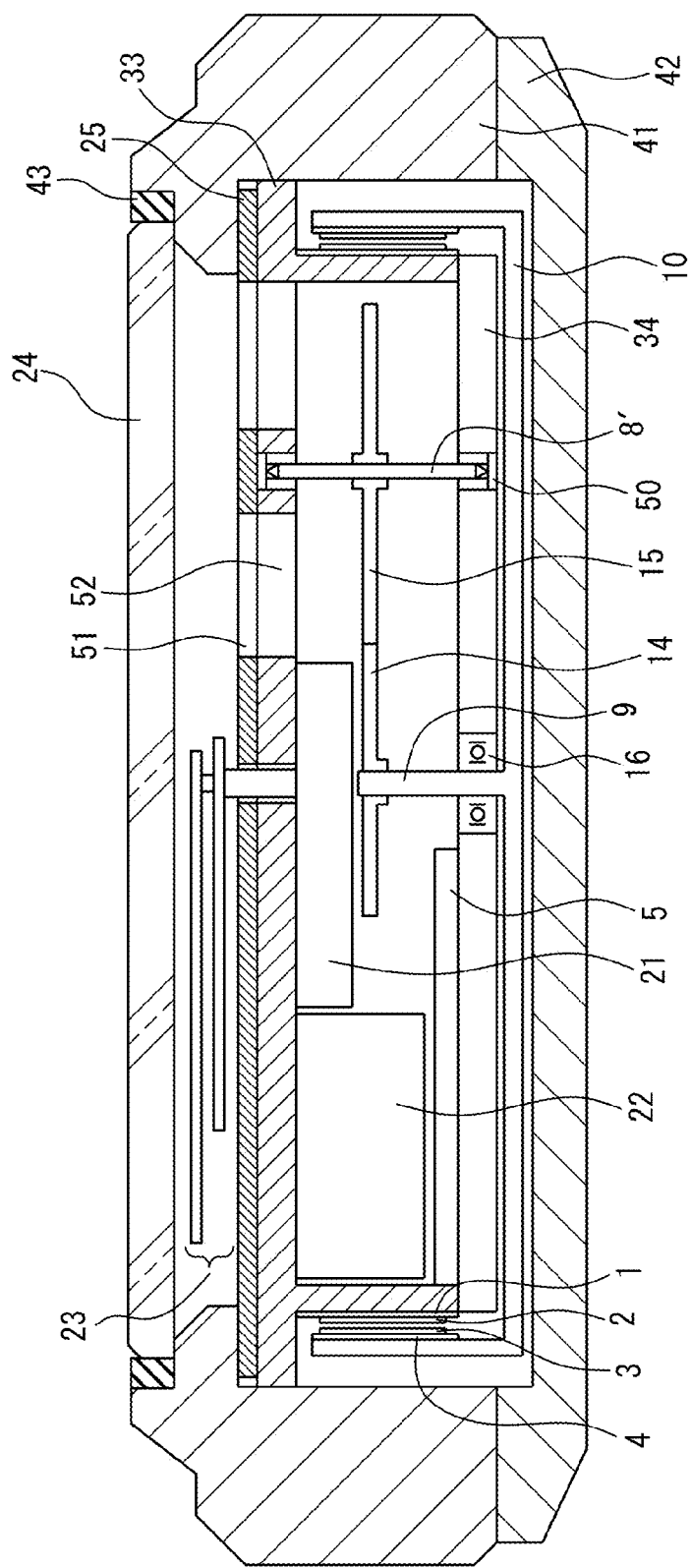
FIG. 19 is a schematic cross-sectional view showing a 10th embodiment of the present invention.

FIG. 19 is a schematic cross-sectional view showing a 10th embodiment of the present invention.

The 10th embodiment, in the same way as the ninth embodiment, enables the transmission of rotation of the rotary member 4 to be visually confirmed from the window parts 51 and 52. In the present embodiment, the rotary member 4 and rotary weight 10 are integrally connected, the charging film 3 and counter electrode 2 are arranged to face each other in a ring shape at the circumferential direction of the shaft 9 of the rotary weight 10, and rotation of the rotary weight 10 (rotary member) is transmitted by gears from the gear 14 fastened to the shaft 9 to the gear 15 to enable visual confirmation of the rotation of the gear 15 (rotary body) in the same way as the ninth embodiment. The charging film 3 and the counter electrode 2 can be provided between the lateral outside cylindrical surface of the rotary weight 10 and the lateral inside cylindrical surface of the outside casing 41. The rotary weight 10 may be semicircular or may be fully circular with an added weight (same in following 11th embodiment as well).

In the present embodiment, the rotary weight 10 also serves as the rotary member 4. A rotary member (substrate) 4 is provided at the cylindrical surface at the inside circumference at the lateral side of the rotary weight 10. The charging film 3 is set there. Further, the counter substrate 1 is provided at the cylindrical surface at the outside circumference at the lateral side of the main plate 33. The counter electrode 2 is set there. If the rotary weight 10 rotates, electrostatic induction generation is caused. The electric power generated between the charging film 3 and the counter electrode 2 is output through a connector (not shown), conductive spring, connecting terminal, etc. to the quartz movement 200 (circuit board 5). At FIG. 19, the charging film 3 is set at the rotary member 4, while the counter electrode 2 is set at the counter substrate 1, but of course even the case where the charging film 3 and counter electrode 2 are oppositely arranged is included in this embodiment.

The gear 15 is set at a position where it can be seen well from the window parts 51 and 52. Due to this, even if outside light enters through the window parts 51 and 52, it becomes easy to block the outside light from the window parts 51 and 52 so that outside light does not strike the charging film 3. In the present embodiment as well, the state of rotation of the rotary weight 10 can be visually confirmed as rotation of the gear 15 by transmission of rotation through the window parts 51 and 52, so the user can check the power generating state.

11th Embodiment

Figure 20:
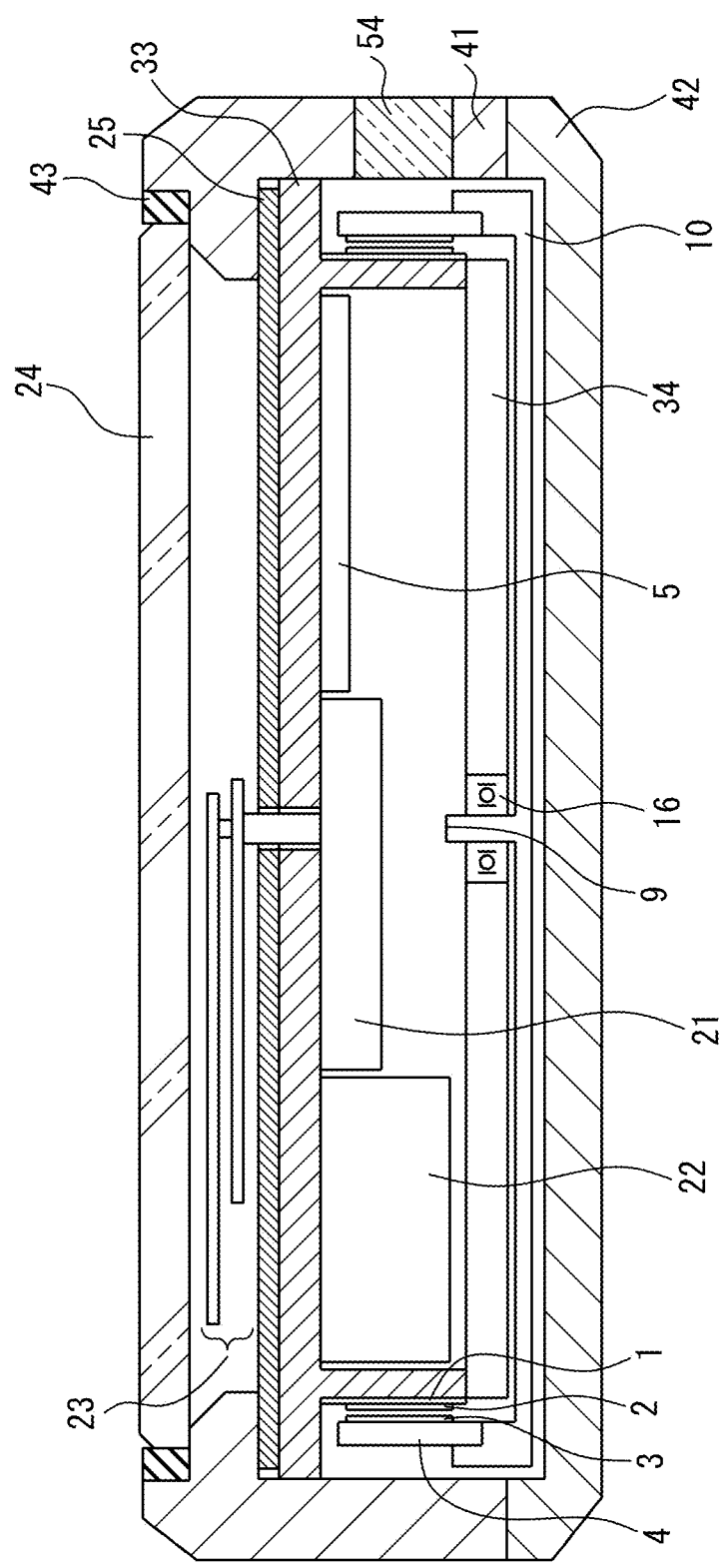
FIG. 20 is a schematic cross-sectional view showing an 11th embodiment of the present invention.
Figure 21:
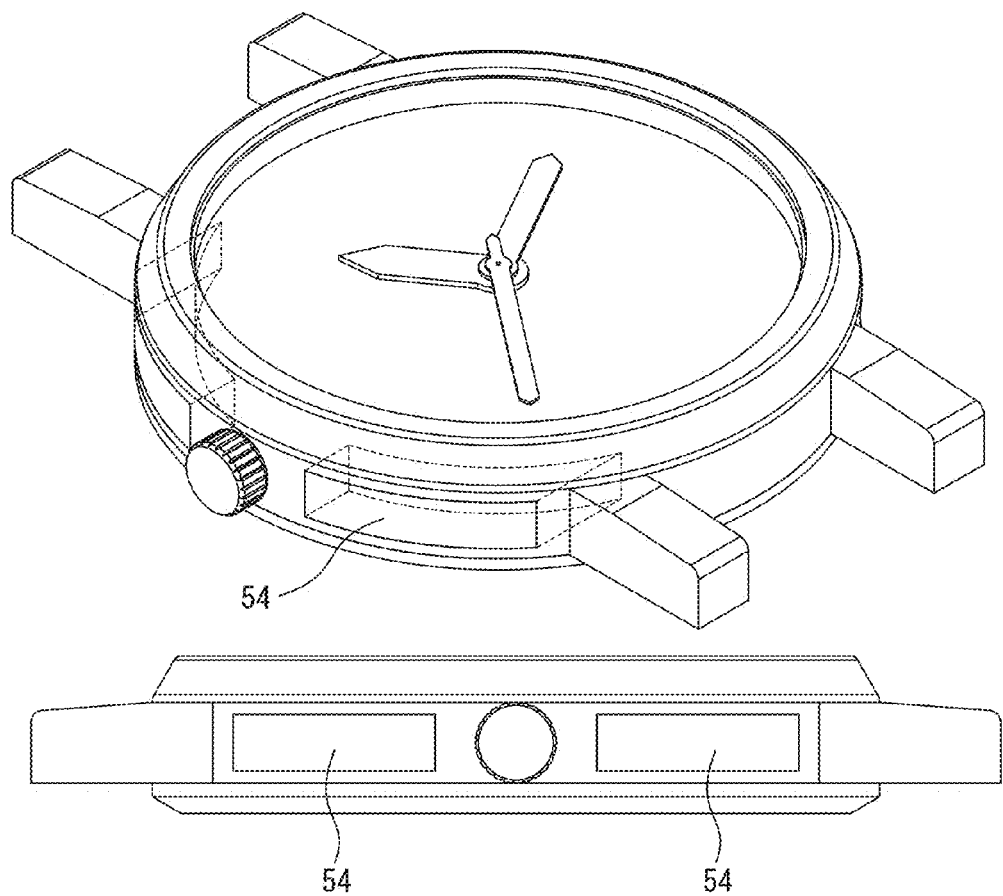
FIG. 21 is a perspective view and side view showing the 11th embodiment of the present invention.

FIG. 20 is a schematic cross-sectional view showing an 11th embodiment of the present invention. FIG. 21 gives a perspective view and side view showing the 11th embodiment of the present invention.

The 11th embodiment changes the position of setting the window part of the 10th embodiment. The provides the window part 54 formed by the transparent member at the outside casing 41 to enable rotation of the rotary member 4 to be directly visually confirmed from the window part 54. The rotary member 4 and the rotary weight 10 are integrally formed and the charging film 3 and counter electrode 2 are arranged in ring forms in the circumferential direction of the shaft of the rotary weight 10 comprised of the shaft 9. The rotary weight 10 is provided with a rotary member 4. This is set with a charging film 3. Further, at the lateral outside cylindrical surface of the main plate 33, a counter substrate 1 is provided and a counter electrode 2 is set. If the rotary weight 10 rotates, electrostatic induction generation is caused. The power generated between the charging film 3 and the counter electrode 2 is output through a connector (not shown), conductive spring, connection terminals, etc. to a quartz movement 200 (circuit board 5). In FIG. 20, the charging film 3 is set at the rotary member 4, while the counter electrode 2 is set at the counter substrate 1, but of course even the case where the charging film 3 and counter electrode 2 are oppositely arranged is included in this embodiment. The rotary member 4 is a non-light passing material.

Due to this, the state of rotation of the rotary weight 10 can be visually confirmed through the window part 54, so the user can confirm the state of power generation.

Figure 22:
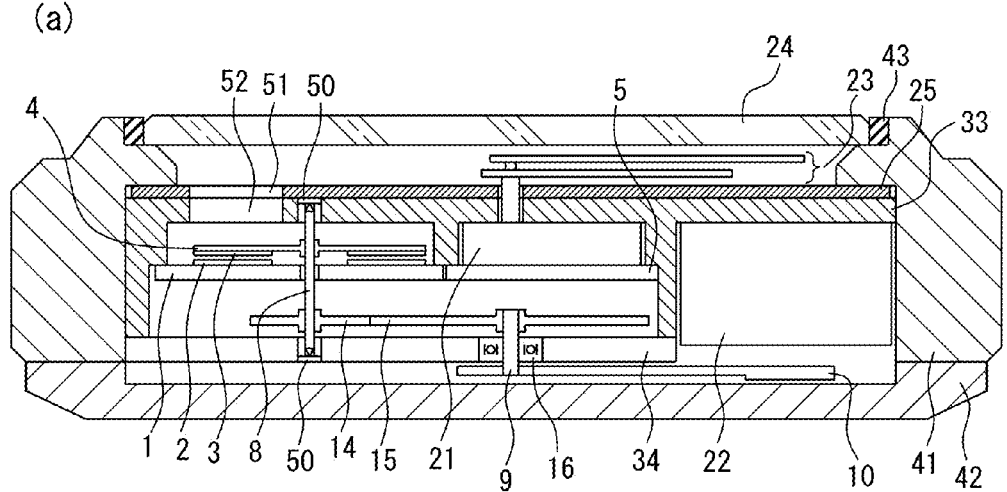
Figure 22:
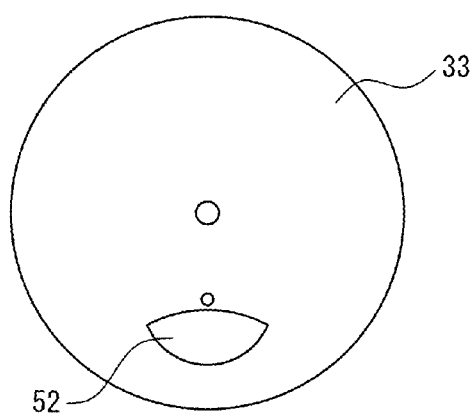

In the above embodiments other than the 10th and 11th embodiments, the counter substrate 1 is formed as the same substrate as the circuit board 5 of the quartz movement, so a single common substrate is sufficient. This is advantageous for making a watch thinner. Further, as shown in FIG. 22, the window parts of the dial plate 25 and the main plate 33 may respectively be single parts. The window part 54 of the 11th embodiment of FIG. 21 may also be a single part. The number of the window parts may be suitably set in each embodiment according to need. In the first to ninth embodiments, it is also possible to omit the window part at the dial plate 25 and provide only one at the main plate 33.

12th Embodiment

Figure 23:
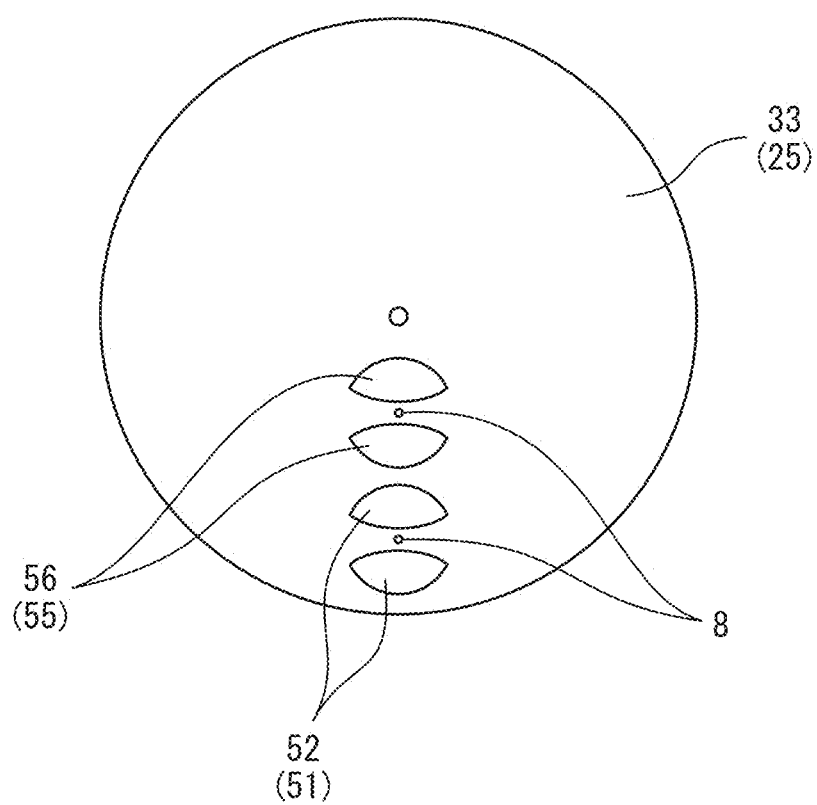
FIG. 23 is a plan view showing a main plate of a 12th embodiment of the present invention.

FIG. 23 is a plan view showing a main plate of a 12th embodiment of the present invention.

The 12th embodiment is an embodiment in which a plurality of sets of window parts 51, 51, 52, 52 are provided for the single rotary member 4 of the first to 10th embodiments. FIG. 23 shows an example of the 12th embodiment in which window parts 51, 51 of the dial plate 25, window parts 52, 52 of the main plate 33, window parts 55, 55 of the dial plate 25, and window parts 56, 56 of the main plate 33 are provided. (Numerals in parentheses in FIG. 23 show case of dial plate.) As shown in FIG. 23, the state of rotation of the rotary member 4 is designed to be able to be visually confirmed through the window parts 52, 56 of the main plate 33 together with the window parts 51, 55 of the dial plate 25. The window parts are not limited to the two sets of the example of FIG. 23. Further pluralities may also be provided.

13th Embodiment

Figure 24:
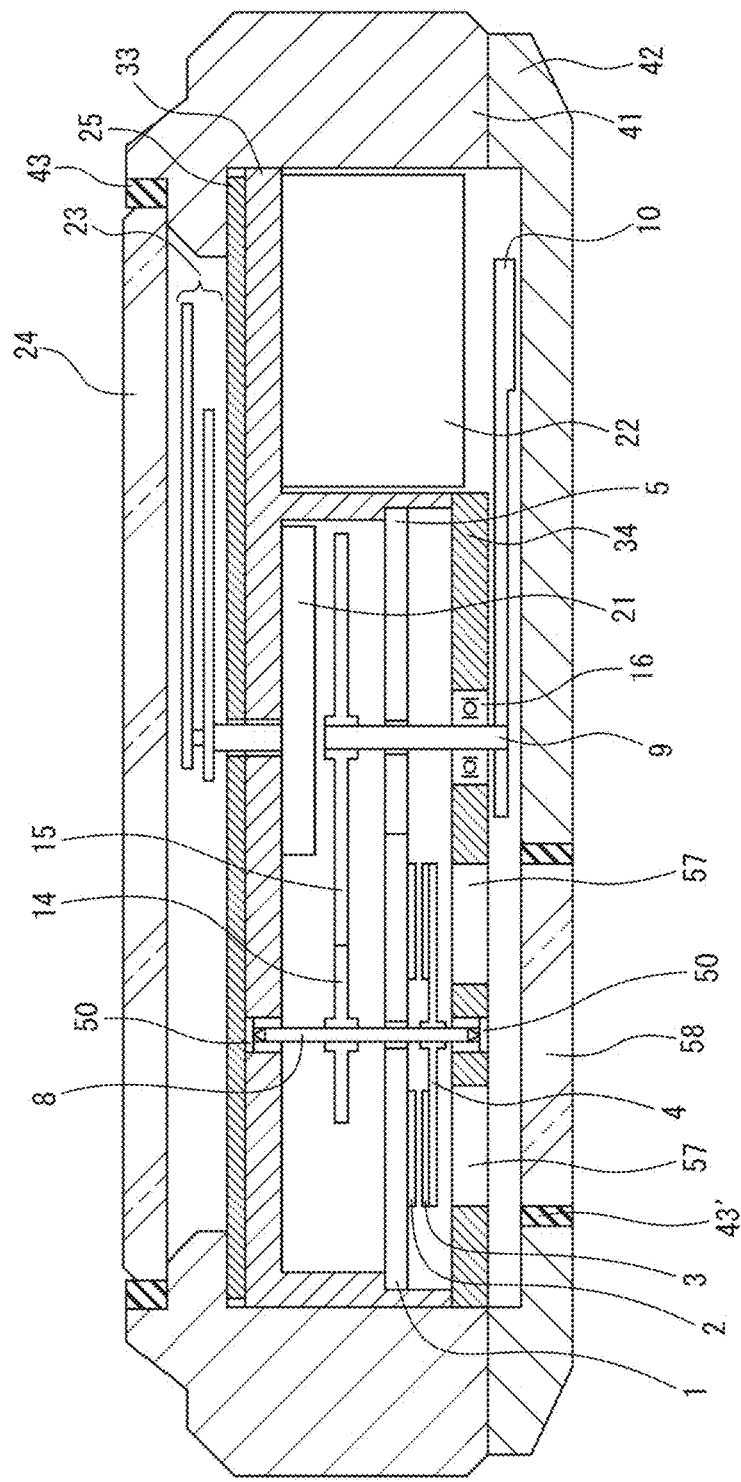
FIG. 24 is a schematic cross-sectional view showing a 13th embodiment of the present invention.

FIG. 24 is a schematic cross-sectional view showing a 13th embodiment of the present invention.

The 13th embodiment is an embodiment designed to enable rotation of the rotary member 4 to be visually confirmed from the case back 42. In the present embodiment, the case back 42 has a window part 58 made of a transparent material fit into it through packing 43'. In the present embodiment, the dial plate 25 and main plate 33 are not provided with window parts, but it is also possible to provide window parts at the dial plate 25 and the main plate 33 like in the ninth embodiment so as to enable rotation of the gear 14 (rotary member) to be visually confirmed. The bridge 34 is provided with window parts 57 similar to the window parts 52 of FIG. 4 (at two locations). These enable rotation of the rotary member 4 to be visually confirmed. The shaft 8 is supported by the bearing 50 provided at the bridge between the two window parts 57 and passes through the counter substrate 1 and is supported at the bridge 34 by the bearing 50. The counter substrate 1 and the circuit board 5 are supported by the main plate 33. The rotary member 4 is provided with a charging film 3, while the counter substrate 1 is provided with a counter electrode 2, but of course even the case where the charging film 3 and the counter electrode 2 are arranged oppositely is included in this embodiment. The rest of the configuration and the action and effects are similar as in the other embodiment.

Note that, the scope of the present invention is not limited to the above-mentioned embodiments and includes addition of various changes to the above embodiments within a range not departing from the gist of the present invention. That is, the specific configurations explained in the embodiments are just examples and can be suitably changed.

REFERENCE SIGNS LIST 1. counter substrate
2. counter electrode
3. charging film
4. rotary member
8, 8', 9. shafts
10. rotary weight
14, 15, 17. gears
21. gear drive part
22. secondary battery
24. protective glass
25. dial plate
33, 34. housing
200. quartz movement
51 and 52, 54, 55, 56, 57, 58. window parts

The invention claimed is:

1. An electronic timepiece with electrostatic induction generator comprising:
   an outside casing including protective glass;
   a dial plate;
   a housing;
   a quartz movement arranged inside said housing;
   an electrostatic induction generator arranged inside said housing, wherein electrostatic induction generator includes
   a rotary weight able to rotate with respect to said housing,
   a rotary member able to rotate with respect to said housing,
   a counter substrate fixed to said housing,
   a charging film set at one of said rotary member and said counter substrate, and
   a counter electrode set facing said charging film at the other of said rotary member and said counter substrate;
   a window part provided at one or more locations of said dial plate, said housing, and said outside casing for visual confirmation of rotation of said rotary member or transmission of rotation; and
   an output part outputting the power generated between said charging film and said counter electrode to said quartz movement,
   wherein said window part is a hole part or a light passing material provided at each of said dial plate and said housing.

2. The electronic timepiece with an electrostatic induction generator according to claim 1, wherein said housing has a main plate and a bridge, said rotary member is axially supported between said main plate and said bridge, and the window part of said dial plate, the window part of said main plate, said rotary member, said counter electrode, said charging film, said counter substrate, and said bridge are arranged in that order.

3. The electronic timepiece with an electrostatic induction generator according to claim 2, wherein said charging film is coated with a light shielding paint.

4. The electronic timepiece with an electrostatic induction generator according to claim 2, wherein a second solar cell module is arranged at a position away from said rotary member in a radial direction of a shaft of said rotary member.

5. The electronic timepiece with an electrostatic induction generator according to claim 1, wherein said housing has a main plate and a bridge, said rotary member is axially supported between said main plate and said bridge, the window part of said dial plate, the window part of said main plate, said counter substrate, said charging film, said counter electrode, said rotary member, and said bridge are arranged in that order, and said counter substrate has a blank space and does not pass light other than at the blank space.

6. The electronic timepiece with an electrostatic induction generator according to claim 5, wherein said bridge is provided with a work confirming window to enable confirmation of the state of setting of the rotary member and state of operation at the time of assembly.

7. The electronic timepiece with an electrostatic induction generator according to claim 5, wherein a first solar cell module is arranged between said rotary member and said bridge.

8. The electronic timepiece with an electrostatic induction generator according to claim 1, wherein a shaft of said rotary member and a shaft of said rotary weight are coupled by a gear transmission mechanism.

9. The electronic timepiece with an electrostatic induction generator according to claim 1, wherein said rotary member and said rotary weight are integrally connected, said charging film and said counter electrode are arranged between an inner lateral surface of said rotary weight and an outer lateral surface of said housing, and said outside casing is provided with a window part of a light passing material to enable rotation of said rotary member to be visually confirmed.

10. The electronic timepiece with an electrostatic induction generator according to claim 1, wherein the electronic timepiece comprises a rotary body transmitting rotation of said rotary member through a gear transmission mechanism and is configured so as to enable rotation of said rotary body to be visually confirmed from said window part and to enable said electrostatic induction generator to be shielded from light.

11. An electronic timepiece with an electrostatic induction generator comprising:
   an outside casing including protective glass;
   a dial plate;
   a housing;

a quartz movement arranged inside said housing;
an electrostatic induction generator arranged inside said housing, wherein electrostatic induction generator includes
a rotary weight able to rotate with respect to said housing,
a rotary member able to rotate with respect to said housing,
a counter substrate fixed to said housing,
a charging film set at one of said rotary member and said counter substrate, and
a counter electrode set facing said charging film at the other of said rotary member and said counter substrate;
a window part provided at one or more locations of said dial plate, said housing, and said outside casing for visual confirmation of rotation of said rotary member or transmission of rotation; and
an output part outputting the power generated between said charging film and said counter electrode to said quartz movement,
wherein said housing has a main plate and a bridge, said rotary member is axially supported between said main plate and said bridge, and the window part of said dial plate, the window part of said main plate, said rotary member, said charging film, said counter electrode, said counter substrate, and said bridge are arranged in that order.

12. The electronic timepiece with an electrostatic induction generator according to claim 11, wherein said counter electrode and said counter substrate have light passing materials and a first solar cell module is arranged between said counter substrate and said bridge.

13. The electronic timepiece with an electrostatic induction generator according to claim 11, wherein a second solar cell module is arranged at a position away from said rotary member in a radial direction of a shaft of said rotary member.

14. An electronic timepiece with an electrostatic induction generator comprising:
an outside casing including protective glass;
a dial plate;
a housing;
a quartz movement arranged inside said housing;
an electrostatic induction generator arranged inside said housing, wherein electrostatic induction generator includes
a rotary weight able to rotate with respect to said housing,
a rotary member able to rotate with respect to said housing,
a counter substrate fixed to said housing,
a charging film set at one of said rotary member and said counter substrate, and
a counter electrode set facing said charging film at the other of said rotary member and said counter substrate;
a window part provided at one or more locations of said dial plate, said housing, and said outside casing for visual confirmation of rotation of said rotary member or transmission of rotation; and
an output part outputting the power generated between said charging film and said counter electrode to said quartz movement,
wherein said housing has a main plate and a bridge, said rotary member is axially supported between said main plate and said bridge, the window part of said dial plate, said counter substrate, said counter electrode, said charging film, said rotary member, and said bridge are arranged in that order, and said counter substrate and said counter electrode have light passing materials or blank spaces.

15. The electronic timepiece with an electrostatic induction generator according to claim 14, wherein said bridge is provided with a work confirming window to enable confirmation of the state of setting of the rotary member and state of operation at the time of assembly.

16. The electronic timepiece with an electrostatic induction generator according to claim 14, wherein a first solar cell module is arranged between said rotary member and said bridge.

* * * * *